US012192394B2

(12) United States Patent
Eom et al.

(10) Patent No.: US 12,192,394 B2
(45) Date of Patent: Jan. 7, 2025

(54) ELECTRONIC DEVICE INCLUDING ROLLABLE DISPLAY

(71) Applicant: SAMSUNG ELECTRONICS CO., LTD., Suwon-si (KR)

(72) Inventors: Kihun Eom, Suwon-si (KR); Kihoon Kang, Suwon-si (KR); Taekeun Kim, Suwon-si (KR); Kwanghee Ryu, Suwon-si (KR); Kihong Min, Suwon-si (KR); Sunghun Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 224 days.

(21) Appl. No.: 17/994,180

(22) Filed: Nov. 25, 2022

(65) Prior Publication Data
US 2023/0093986 A1 Mar. 30, 2023

Related U.S. Application Data

(63) Continuation of application No. PCT/KR2021/006446, filed on May 24, 2021.

(30) Foreign Application Priority Data

May 26, 2020 (KR) ........................ 10-2020-0063140

(51) Int. Cl.
G06F 1/16 (2006.01)
G06F 3/041 (2006.01)
(Continued)

(52) U.S. Cl.
CPC ........ H04M 1/0268 (2013.01); G06F 1/1624 (2013.01); G06F 1/1652 (2013.01); G06F 3/0412 (2013.01); G09F 9/301 (2013.01)

(58) Field of Classification Search
CPC ............. H04M 1/0268; H04M 1/0241; H04M 1/72454; G06F 1/1624; G06F 1/1652; G06F 3/0412; G06F 3/0488; G09F 9/301
See application file for complete search history.

(56) References Cited

U.S. PATENT DOCUMENTS 8,174,628 B2  5/2012  Matsushita et al.
9,836,148 B2  12/2017  Kim et al.
(Continued)

FOREIGN PATENT DOCUMENTS

KR         10-0501188         7/2005
KR      10-2016-0140036       12/2016
(Continued)

OTHER PUBLICATIONS

Korean Office Action issued Aug. 5, 2024 in corresponding Korean Patent Application No. 10-2020-0063140.
(Continued)

Primary Examiner — Sagar Shrestha
(74) Attorney, Agent, or Firm — Nixon & Vanderhye, P.C.

(57) ABSTRACT

A housing of an electronic device according to an embodiment may include a combination of at least two housings, and the entire size or length of the electronic device may change according to relative movement between the housings. The electronic device may comprise: a flexible display configured to expand or contract according to a change in size of the electronic device. A portion of the flexible display may be inserted into the housing when the housing contracts and may be drawn out of the housing when the housing expands. The electronic device may comprise a distance sensor and/or an expansion sensor. The distance sensor is configured to measure a change in a relative distance of the housing, and the expansion sensor senses a contraction or expansion state of the housing, thereby contributing to
(Continued)

correcting data measured by the distance sensor. The electronic device employing the distance sensor and/or the expansion sensor can accurately sense the size of an externally visible portion of a display and can display a screen appropriate to the size of the visible portion of the display.

20 Claims, 13 Drawing Sheets

(51) Int. Cl.
*G09F 9/30* (2006.01)
*H04M 1/02* (2006.01)

(56) References Cited

U.S. PATENT DOCUMENTS

| | | | |
|---|---|---|---|
| 10,379,720 B2 | 8/2019 | Ryu et al. | |
| 10,416,722 B2 | 9/2019 | Cho et al. | |
| 10,470,133 B2 | 11/2019 | Kim et al. | |
| 10,671,124 B2 | 6/2020 | Kim et al. | |
| 10,936,100 B2 | 3/2021 | Park et al. | |
| 10,957,875 B2 | 3/2021 | Song et al. | |
| 11,252,826 B2 | 2/2022 | Park et al. | |
| 11,348,490 B1* | 5/2022 | Kwak | G06F 3/0414 |
| 11,838,433 B1* | 12/2023 | Kumar Agrawal | H04M 1/0235 |
| 11,994,910 B2* | 5/2024 | Cho | G06F 1/1652 |
| 2013/0314387 A1* | 11/2013 | Kwack | G09G 5/005 345/207 |
| 2014/0002430 A1* | 1/2014 | Kwack | G09G 3/035 345/207 |
| 2016/0353588 A1 | 12/2016 | Kim et al. | |
| 2017/0061932 A1 | 3/2017 | Kwon et al. | |
| 2017/0064847 A1 | 3/2017 | Lim | |
| 2017/0308346 A1 | 10/2017 | Lee et al. | |
| 2018/0217679 A1 | 8/2018 | Kwon et al. | |
| 2019/0261519 A1* | 8/2019 | Park | H05K 1/118 |
| 2022/0351656 A1* | 11/2022 | George Philip | G06F 1/1652 |
| 2023/0236637 A1* | 7/2023 | Yoon | G09G 3/035 345/168 |
| 2023/0276584 A1* | 8/2023 | Jung | G09F 9/301 361/807 |
| 2024/0048025 A1* | 2/2024 | Cho | H02P 1/22 |

FOREIGN PATENT DOCUMENTS

| | | |
|---|---|---|
| KR | 10-2017-0010953 | 2/2017 |
| KR | 10-2017-0011675 | 2/2017 |
| KR | 10-2017-0024942 | 3/2017 |
| KR | 10-2017-0073958 | 6/2017 |
| KR | 10-2017-0097941 | 8/2017 |
| KR | 10-1903743 | 10/2018 |
| KR | 10-2019-0068919 | 6/2019 |
| KR | 10-2019-0083687 | 7/2019 |
| KR | 10-2019-0101184 | 8/2019 |
| KR | 10-2019-0141518 | 12/2019 |
| KR | 10-2020-0045946 | 5/2020 |
| WO | 10-2015-178518 | 11/2015 |
| WO | 2021/075610 | 4/2021 |
| WO | 2021/132740 | 7/2021 |

OTHER PUBLICATIONS

International Search Report for PCT/KR2021/006446, mailed Sep. 6, 2021, 5 pages.
Written Opinion of the ISA for PCT/KR2021/006446, mailed Sep. 6, 2021, 5 pages.

* cited by examiner

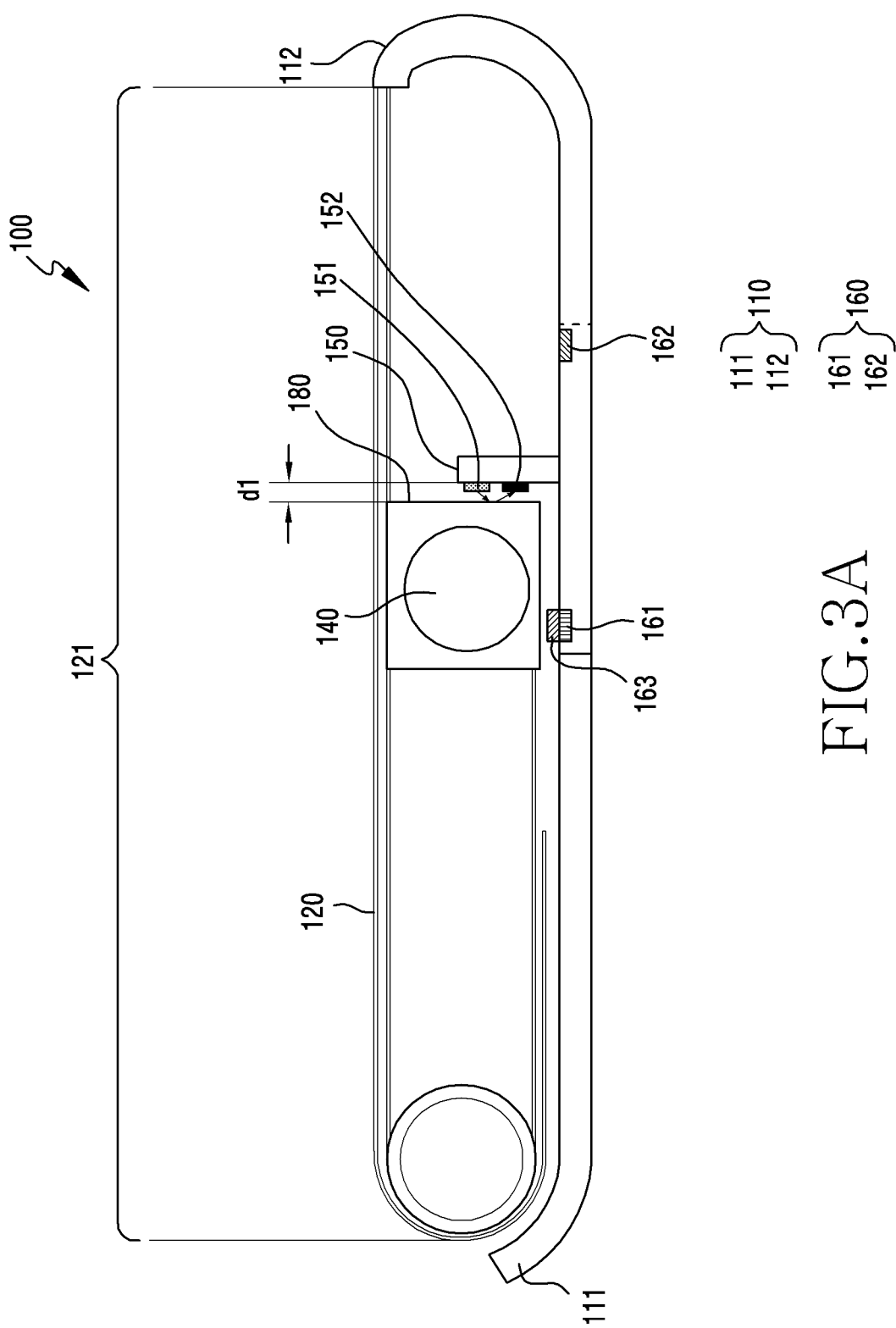

ELECTRONIC DEVICE INCLUDING ROLLABLE DISPLAY

CROSS-REFERENCE TO RELATED APPLICATIONS

This application is a continuation of International Application No. PCT/KR2021/006446 designating the United States, filed on May 24, 2021, in the Korean Intellectual Property Receiving Office and claiming priority to Korean Patent Application No. 10-2020-0063140, filed on May 26, 2020, in the Korean Intellectual Property Office, the disclosures of which are incorporated by reference herein in their entireties.

BACKGROUND

Field

The disclosure relates to an electronic device including a rollable display, and for example, to a method for recognizing an extension length of a rollable display.

Description of Related Art

An electronic device employing a rollable display may provide a wide screen and portability simultaneously. As a part of the display is rolled in the electronic device and the display contracts, portability may be guaranteed. In addition, when the display is extended, the electronic device including the rollable display may provide a wide screen.

A related-art electronic device including a rollable display may include various means for detecting a degree of extension of the display. For example, the electronic device may include various magnets arranged at regular intervals along a direction in which the display is extended, and may determine an extension length of the display according to the number of magnets detected by a hall sensor while the display is being extended and/or contracted. In another example, the electronic device may measure the number of rotations of a motor for extending the display, using an encoder, and may determine an extension length of the display based on the number of rotations.

In the case of a related-art electronic device that determines a degree of extension of a display using a hall sensor, many magnets should be arranged in a housing structure, and accordingly, there may be a disadvantage in terms of utilization of space, and performance of other electronic components may be degraded due to the magnets. In addition, since an encoder is a component that requires a large volume due to its characteristic, it may be inappropriate that a portable smart device such as a smartphone required to have a thin thickness employs the encoder.

SUMMARY

Embodiments of the disclosure may provide a means for determining an extension state of a rollable display while maintaining a thin thickness of an electronic device.

Embodiments of the disclosure may provide an electronic device employing a rollable display that may determine which portion of an entire region of the display is visible to the outside of the electronic device. Accordingly, the electronic device may display a screen with a size corresponding to the portion visible from the outside in the entire region of the display.

The technical effects to be achieved by the disclosure are not limited to those mentioned above, and other technical effects that are not mentioned above may be clearly understood to those skilled in the art based on the description provided below.

According to an example embodiment, an electronic device may include: a housing including a first housing and a second housing coupled to the first housing structure to be movable with respect to the first housing within a specified range; a rollable display visible to an outside of the electronic device through a part of the housing, the rollable display including a first portion selectively visible to the outside according to the movement of the second housing with respect to the first housing, the first portion being visible to the outside based on the second housing structure moving in a first direction away from the first housing structure, and the first portion not being visible to the outside based on the second housing moving in a second direction opposite to the first direction; a first sensor disposed in the second housing and configured to measure a distance of the second housing to the first housing; a second sensor disposed in the housing and configured to detect a first state in which the second housing is spaced apart from the first housing by a first distance; a memory disposed in the housing and including data regarding the first distance; and at least one processor disposed in the housing and operatively coupled with the rollable display, the first sensor, the second sensor, and the memory, and, based on a screen being displayed through the display, the at least one processor may be configured to: measure the distance of the second housing to the first housing through the first sensor; based on the first state being detected through the second sensor, correct the distance measured by the first sensor, based at least on a difference between the distance measured by the first sensor and the first distance; and adjust the screen to correspond to a size of a portion visible to the outside of the electronic device in an entire region of the rollable display, based on the corrected distance.

According to an example embodiment, a method of controlling an electronic device including an extendable housing and a rollable display contracted or extended according to contraction or extension of the housing may include: displaying a screen through the display; measuring an extension distance of the housing through a first sensor provided in the electronic device; based on a first state of the housing structure being detected through a second sensor provided in the electronic device, correcting the distance measured by the first sensor, based at least on a difference between the distance measured through the first sensor and a specified distance, the specified distance corresponding to an extension distance of the housing based on the housing being in the first state; and adjusting the screen to correspond to a size of a portion visible to an outside in an entire region of the display, based on the corrected length.

According to various example embodiments of the disclosure, an electronic device employing the rollable display may provide a screen of a size corresponding to a degree of extension of the display. The electronic device according to various embodiments of the disclosure may detect a portion that is visible to the outside in the entire region of the display in real time while the display is being contracted and/or extended. Accordingly, contents displayed on the screen may continuously change according to the contraction and/or extension of the display. For example, a size of an image may be reduced and/or enlarged to a size corresponding to the contraction and/or extension of the display. As a result, usability of the rollable display be enhanced.

The electronic device employing the rollable display may include a driver configured to contract and/or extend the display, and accordingly, may have a relatively high risk of a breakdown compared to a normal electronic device. According to an embodiment of the disclosure, the electronic device employing the rollable display may provide a method for protecting the driver for contracting and/or extending the display. Through this, durability of the electronic device employing the rollable display may be enhanced.

The effects achieved in the disclosure are not limited to those mentioned above, and other effects that are not mentioned above may be clearly understood to those skilled in the art based on the description provided below.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3A is a cross-sectional view illustrating an electronic device in a contraction state according to various embodiments;

DETAILED DESCRIPTION

Figure 1A:
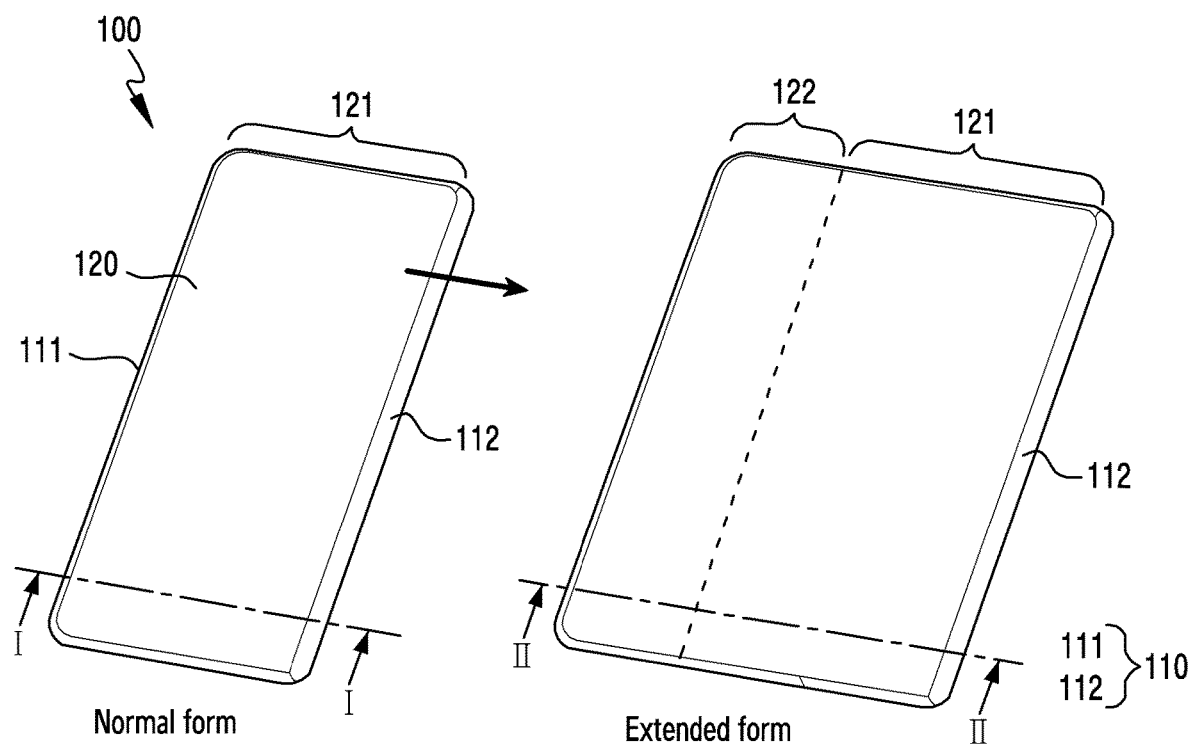
FIG. 1A is a perspective view illustrating an electronic device including a rollable display which is horizontally extended according to various embodiments.
Figure 1B:
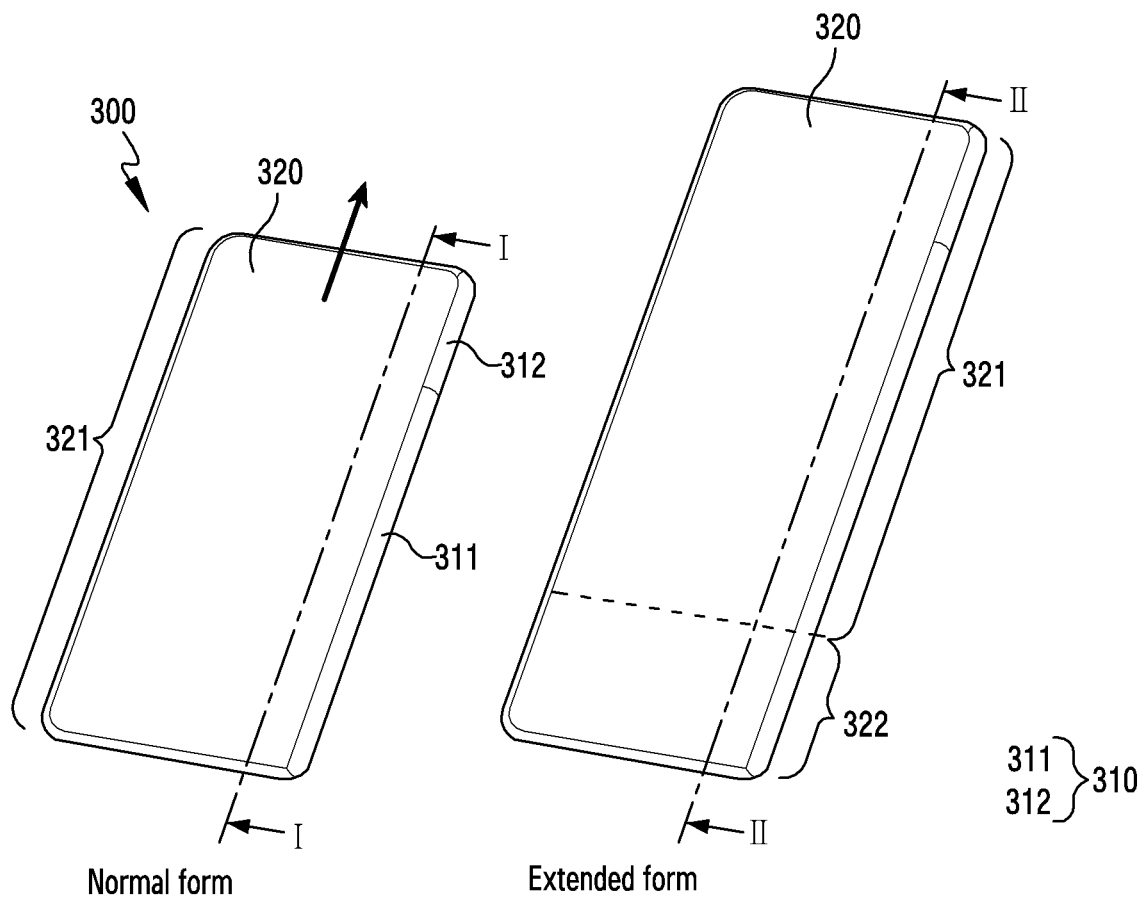
FIG. 1B is a perspective view illustrating an electronic device including a rollable display which is vertically extended according to various embodiments.

FIG. 1A is a perspective view illustrating an electronic device 100 including a rollable display 120 which is horizontally extended according to various embodiments. FIG. 1B is a perspective view illustrating an electronic device 300 including a rollable display 120 which is vertically extended according to various embodiments.

Referring to FIG. 1A, the display 120 of the electronic device 100 may be contracted or extended according to a change of the state of a housing structure 110. In an embodiment, the electronic device 100 may include a part or an entirety of components of an electronic device 1001 of FIG. 1.

In an embodiment, the electronic device 100 may include the housing structure (e.g., housing) 110 which is contractible and/or extendable. In an embodiment, the electronic device 100 may include a first housing structure (e.g., first housing) 111 and a second housing structure (e.g., second housing) 112 which is coupled to be movable with respect to the first housing structure 111 within a predetermined (e.g., specified) range. When the second housing structure 112 moves in the direction of an arrow (for example, a first direction) with respect to the first housing structure 111, an area of the housing structure 110 may be extended, and, when the second housing structure 112 moves in the opposite direction (for example, a second direction) of the direction of the arrow, the area of the housing structure 110 may be contracted. An entire size of the electronic device 100 may be reduced and/or enlarged according to the contraction and/or extension of the housing structure 110.

In an embodiment, a distance between the first housing structure 111 and the second housing structure 112 may increase or decrease according to a movement of the second housing structure 112 to the first housing structure 111. In various embodiments of the disclosure, the distance between the first housing structure 111 and the second housing structure 112 may be defined as a distance between a certain point of the first housing structure 111 and a certain point of the second housing structure 112. For example, when the electronic device 100 includes a distance sensor (for example, a proximity sensor, a time of flight (TOF) sensor) disposed in the second housing structure 112 and the first housing structure 111 includes an object (for example, an object 180 of FIG. 3A) reflecting light of the distance sensor, the distance between the first housing structure 111 and the second housing structure 112 may be defined as a distance between the distance sensor disposed in the second housing structure 112 and the object 180 of the first housing structure 111.

In an embodiment, the electronic device 100 may include the rollable display 120. In an embodiment, the rollable display 120 may include a first portion 121 which is always exposed (e.g., visible, as used herein, the term "exposed" may be used interchangeably with the term "visible" and covers a situation in which a display includes a cover layer) to the outside, and a second portion 122 which is selectively exposed to the outside. In an embodiment, the second portion 122 of the rollable display 120 may be rolled in or rolled out from the housing structure 110. When the second portion 122 is rolled out, the second portion 122 may be viewed from the outside, and, when the second portion 122 is rolled in, the second portion 122 may not be viewed from the outside. In various embodiments of the disclosure, the second portion 122 may be referred to as a rolling portion 122. In various embodiments of the disclosure, the rollable display 120 may be simply referred to as a display 120. In various embodiments of the disclosure, the display 120 being exposed may refer, for example, to the display 120 being viewed or visible from the outside of the electronic device 100.

In an embodiment, when the second housing structure 112 moves in the direction of the arrow with respect to the first housing structure 111, the rolling portion 122 may be exposed to the outside and the display 120 may be extended. In an embodiment, when the second housing structure 112 moves in the opposite direction of the direction of the arrow with respect to the first housing structure 111, the rolling portion 122 may be rolled in the housing structure 110 and the display 120 may be contracted. In various embodiments of the disclosure, the housing structure 110 or the display 120 being contracted and/or extended may refer, for example, to a size of a portion that is exposed to the outside in the entire region of the housing structure 110 or the display 120 being reduced and/or enlarged according to a movement of the second housing structure 112 to the first housing structure 111.

In various embodiments of the disclosure, a state in which the display 120 is contracted to a minimum and/or is extended to a maximum may be referred to as a contraction and/or extension state (or a minimum contraction and/or maximum extension state). In addition, a state in which the display 120 is between the maximum extension state and the minimum contraction state may be referred to as an intermediate extension state (or an intermediate state).

Referring to FIG. 1B, a display 320 of the electronic device 300 may be contracted or extended according to a change in the state of a housing structure 310. In an embodiment, the electronic device 300 may include a part or an entirety of components of the electronic device 1001 of FIG. 10.

In an embodiment, the electronic device 300 may include the housing structure 310 which is contractible and/or extendable. In an embodiment, the electronic device 300 may include a first housing structure 311 and a second housing structure 312 which is coupled to be movable with respect to the first housing structure 311 within a predetermined range. When the second housing structure 312 moves in the direction of an arrow (for example, a first direction) with respect to the first housing structure 311, an area of the housing structure 310 may be extended, and, when the second housing structure 312 moves in the opposite direction (for example, a second direction) of the direction of the arrow, the area of the housing structure 310 may be contracted. An entire size of the electronic device 300 may be reduced and/or enlarged according to the contraction and/or extension of the housing structure 310.

In an embodiment, a distance between the first housing structure 311 and the second housing structure 312 may increase or decrease according to a movement of the second housing structure 312 to the first housing structure 311. In various embodiments of the disclosure, the distance between the first housing structure 311 and the second housing structure 312 may be defined as a distance between a certain point of the first housing structure 311 and a certain point of the second housing structure 312.

In an embodiment, the electronic device 300 may include a rollable display 320. In an embodiment, the rollable display 320 may include a first portion 321 which is always exposed to the outside, and a second portion 322 which is selectively exposed to the outside. In an embodiment, the second portion 322 of the rollable display 320 may be rolled in or rolled out from the housing structure 310. When the second portion 322 is rolled out, the second portion 322 may be viewed from the outside, and, when the second portion 322 is rolled in, the second portion 322 may not be viewed from the outside. In various embodiments of the disclosure, the second portion 322 may be referred to as a rolling portion 322. In various embodiments of the disclosure, the rollable display 320 may be simply referred to as a display 320. In various embodiments of the disclosure, the display 320 being exposed may refer, for example, to the display 320 being viewed from the outside of the electronic device 300.

In an embodiment, when the second housing structure 312 moves in the direction of the arrow with respect to the first housing structure 311, the rolling portion 322 may be exposed to the outside and the display 320 may be extended. In an embodiment, when the second housing structure 312 moves in the opposite direction of the direction of the arrow with respect to the first housing structure 311, the rolling portion 322 may be rolled in the housing structure 310 and the display 320 may be contracted. In various embodiments of the disclosure, the housing structure 310 or the display 320 being contracted and/or being extended may refer, for example, to a size of a portion that is exposed to the outside in the entire region of the housing structure 310 or the display 320 being reduced and/or enlarged according to a movement of the second housing structure 312 to the first housing structure 311.

In various embodiments of the disclosure, a state in which the display 320 is contracted to a minimum and/or is extended to a maximum may be referred to as a contraction and/or extension state (or a minimum contraction and/or maximum extension state). In addition, a state in which the display 320 is between the maximum extension state and the minimum contraction state may be referred to as an intermediate extension state (or an intermediate state).

An electronic device which will be described hereinbelow may be illustrated and described with respect to a device having a form factor of the form shown in FIG. 1A for convenience of explanation. However, embodiments of the disclosure are not limited thereto, and features applied to the electronic device 100 of FIG. 1A may also be applied to the electronic device 300 of FIG. 1B or any other suitable alternative.

Figure 2:
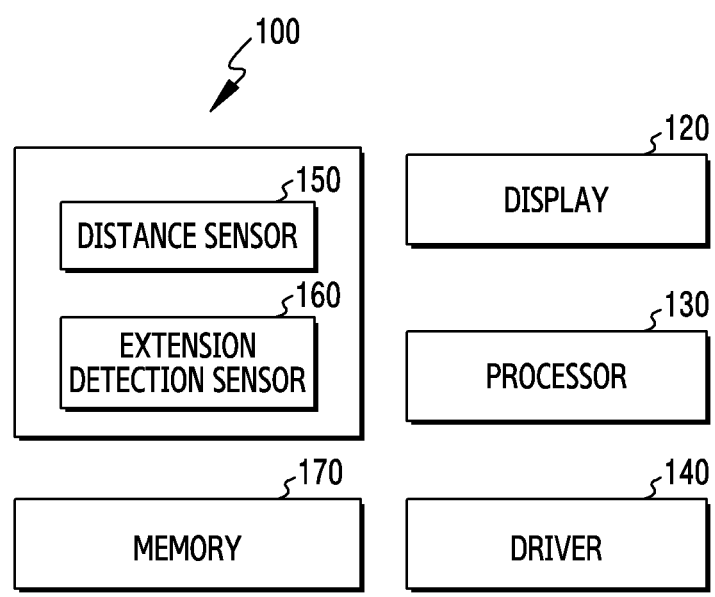
FIG. 2 is a block diagram illustrating example components provided in a housing structure of the electronic device of FIG. 1A according to various embodiments.

FIG. 2 is a block diagram illustrating example components provided in the housing structure 110 of the electronic device 100 according to various embodiments.

In an embodiment, the electronic device 100 may include at least one sensor disposed in the housing structure 110. In an embodiment, the electronic device 100 may include a distance sensor configured to measure a degree of extension of the housing structure 110. For example, referring to FIG. 1A, the distance sensor 150 may be configured to measure a distance of the second housing structure 112 to the first housing structure 111. The distance sensor 150 may measure the distance of the second housing structure 112 to the first housing structure 111 in real time. Accordingly, the electronic device 100 may determine a size of the display 120 that is viewed from the outside in real time through the distance sensor 150, and may display a screen based on the size of the display 120.

In an embodiment, the distance sensor 150 may include at least one of an optical distance sensor, an ultrasonic distance sensor, or a distance sensor of a radio wave method. In an embodiment, the distance sensor 150 may measure a distance in various methods. In an embodiment, the distance sensor 150 of a TOF method may measure a distance using the time that it takes for light or radio waves emitted from the distance sensor 150 to be reflected from another object and to return to the distance sensor 150. In an embodiment, the distance sensor 150 of an optical method may measure a distance using an amount of light collected by the distance sensor 150. For example, a distance may be longer as an amount of light measured by the distance sensor when light emitted from a specific light source arrives at the distance sensor 150 is less, and the distance may be shorter as the amount of light is greater. In an embodiment, the distance sensor 150 of a pattern analysis method may estimate a distance using a marker or an identifiable reference point. For example, the electronic device 100 may measure a distance between two points displayed on a specific object using a camera as one component of the distance sensor 150. As a distance between the camera and the specific object is shorter, the gap between the two points may be longer, and as the distance is longer, the gap may be shorter.

In an embodiment, the at least one sensor may include an extension detection sensor 160. In an embodiment, the extension detection sensor 160 may be configured to detect a first state in which the second housing structure 112 is spaced apart from the first housing structure 111 by a first distance, and/or a second state in which the second housing structure 112 is spaced apart from the first housing structure 111 by a second distance. For example, the extension detection sensor 160 may be configured to detect a state in which the housing structure 110 is extended to a maximum, a state in which the housing structure 110 is contracted to a minimum, or an intermediate extension state.

In an embodiment, the extension detection sensor 160 may be configured to detect a contraction and/or extension state of the display 120. For example, the extension detection sensor 160 may be configured to generate an electrical signal in the extension state and the contraction state of the display 120, respectively. In an embodiment, the extension detection sensor 160 may be implemented through at least one of an interaction between a hall sensor and a magnet, pressing by a physical switch, or contact between terminals.

In an embodiment, the electronic device 100 may include at least one processor (e.g., including processing circuitry) 130. The at least one processor 130 may be electrically or operatively connected with the display 120, a driver (e.g., including driving circuitry) 140, the distance sensor 150, the extension detection sensor 160, and a memory 170. In an embodiment, the at least one processor 130 may determine how the display 120 is contracted and/or extended, using the distance sensor 150. In an embodiment, the at least one processor 130 may determine whether the housing structure 110 is in an extension state or a contraction state using the extension detection sensor 160.

In an embodiment, the electronic device 100 may include the driver 140. Referring to FIG. 1A, the driver 140 may be configured to move the second housing structure 112 with respect to the first housing structure 111. In an embodiment, the electronic device 100 may enlarge or reduce the size of the display 120 which is exposed to the outside of the electronic device 100 through the driver 140. An operation of the driver 140 may be controlled by the at least one processor 130. For example, the at least one processor 130 may transmit a control value to a motor included in the driver 140, and may drive the motor.

In an embodiment, the electronic device 100 may include the memory 170. The memory 170 may store data regarding a distance of the second housing structure 112 to the first housing structure 111. A distance between the second housing structure 112 and the first housing structure 111 in a maximum extension state or a minimum contraction state of the display 120 may have a fixed value that is determined by a hardware configuration of the electronic device 100. The memory 170 may store data regarding a distance between the second housing structure 112 and the first housing structure 111 in an extension state and a contraction state of the display 120.

Embodiments described in FIG. 2 with reference to the electronic device 100 of FIG. 1A may be equally applied to the electronic device 300 of FIG. 1B. For example, the electronic device 300 of FIG. 1B may include at least one of the components illustrated in FIG. 2.

Figure 3B:
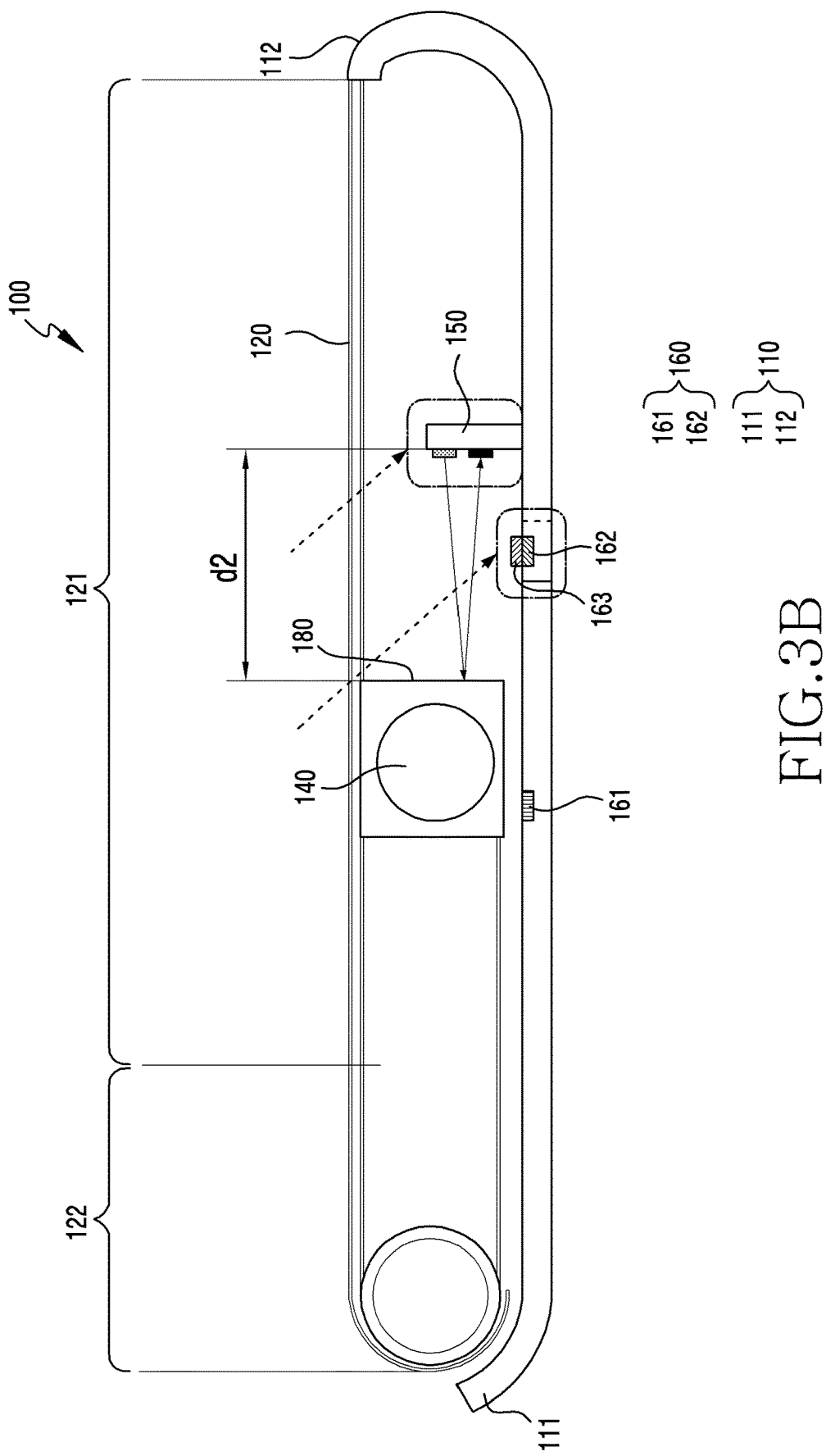
FIG. 3B is a cross-sectional view illustrating an electronic device in an extension state according to various embodiments.

FIG. 3A is a cross-sectional view illustrating an electronic device in a contraction state according to various embodiments. FIG. 3B is a cross-sectional view illustrating an electronic device in an extension state according to various embodiments. FIG. 3A is a cross sectional view of the electronic device of FIG. 1A or 1B, taken along line I-I, according to various embodiments. FIG. 3B is a cross-sectional view of the electronic device of FIG. 1A or 1B, taken along line II-II, according to various embodiments.

Detecting a distance between the housings or detecting a state (extension or contraction) of the housing, and details in FIGS. 3A and 3B will be described using the components of the electronic device 100 of FIG. 1A. This is for convenience of explanation, and embodiments described regarding the electronic device 100 of FIG. 1A may be equally applied to the electronic device 300 of FIG. 1B.

In an embodiment, the electronic device 100 may include the housing structure 110 forming a part of the exterior of the electronic device 100. In an embodiment, the second housing structure 112 may be coupled to be movable with respect to the first housing structure 111. Referring to FIGS. 3A and 3B, according to a movement of the second housing structure 112 to the first housing structure 111, the size of the housing structure 110 of the electronic device may be enlarged or may be reduced. When the second housing structure 110 moves in the first direction with respect to the first housing structure 111, the entire size of the housing structure 110 may be reduced. When the second housing structure 112 moves in the second direction which is the opposite direction of the first direction with respect to the first housing structure 111, the entire size of the housing structure 110 may be enlarged. In various embodiments of the disclosure, the contraction and/or extension of the housing structure 110 (or the electronic device 100) may refer to reduction and/or enlargement of the entire size of the housing structure 110 according to a position relationship between the first housing structure 111 and the second housing structure 112.

In an embodiment, the electronic device 100 may include the rollable display 120. In an embodiment, a portion of the rollable display 120 may be selectively exposed on a front surface of the housing structure 110 of the electronic device 100 according to contraction and/or extension of the housing structure 110. For example, the rollable display 120 may include the first portion 121 which is always exposed to the outside regardless of whether the display 120 is extended, and the second portion 122 which is selectively exposed to the outside according to whether the display 120 is extended. The second portion 122 may be rolled out and may be exposed to the outside according to extension of the housing structure 110, or may be rolled in and may not be exposed to the outside according to contraction of the housing structure 110. Referring to FIG. 3A, the first portion 121 may be exposed on the front surface of the electronic device 100, whereas the second portion 122 may be rolled in the housing structure 110 and may not be exposed to the outside. Referring to FIG. 3B, the second portion 122 may be rolled out and may be exposed on the front surface of the electronic device 100 along with the first portion 121.

In an embodiment, the electronic device 100 may include the driver 140. In an embodiment, the driver 140 may be configured to move the second housing structure 112 with respect to the first housing structure 111. For example, the driver 140 may include a motor and mechanical elements (for example, a rolling gear) operated by the motor. The motor may be connected to the processor 130 of the electronic device 100 and may operate to contract or extend the housing structure 110 in response to a signal of the processor 130.

In an embodiment, the electronic device 100 may include the distance sensor 150 disposed in the second housing structure 112. In an embodiment, the distance sensor 150 may move integrally with the second housing structure 112. In the illustrated embodiment, the distance sensor 150 may be implemented by a TOF sensor. The TOF sensor may include a light emitting part 151 and a light receiving part 152. The light emitting part 151 of the TOF sensor may emit light toward the object 180 disposed in the first housing structure 111. The object 180 may include, for example, a structure or an electronic component disposed in the first housing structure 111. Light (or signal) emitted from the light emitting part 151 of the TOF sensor may be reflected on a part of the surface of the object 180, and may travel toward the light receiving part 152 of the TOF sensor. In an embodiment, the object 180 for reflecting toward the TOF sensor may have a surface assisting reflection of light (or signal). For example, the surface of the object 180 may include a specific color (for example, white) and/or a specific pattern.

The TOF sensor may measure a distance between the TOF sensor and the object 180 using the time that it takes for light emitted from the light emitting part 151 to be reflected by the object 180 and to return to the light receiving part 152. The TOF sensor may emit a signal through the light emitting part 151 and may detect a signal at the light receiving part 152, and may measure a time of flight of the signal using a time interval between emission of the signal and detection of the signal. Since a signal emitted from the light emitting part 151 influences the light receiving part 152, a blocking film (not shown) may be installed between the light emitting part 151 and the light receiving part 151. The light emitting part 151 may send light modulated into a signal of a specific frequency (f), and the light receiving part 152 may detect light returning after being reflected from an object. Herein, the signal may be modulated into a pulse wave or a continuous wave (CW). While a signal (for example, light) is being exchanged between the TOF sensor and the object 180, a phase of the signal may be changed, and the TOF sensor may calculate a distance between the TOF sensor and the object using a change in the phase.

In the illustrated embodiment, the distance measured by the TOF sensor may have a range between a first distance d1 and a second distance d2. The first distance d1 may be a distance between the first housing structure 111 and the second housing structure 112 when the housing structure 110 is contracted to a minimum, and the second distance d2 may be defined as a distance between the first housing structure 111 and the second housing structure 112 when the housing structure 110 is extended to a maximum. For example, the electronic device 100 may measure a distance between a certain point (that is, the object 180) of the first housing structure 111 and a certain point (that is, the TOF sensor) of the second housing structure 112 through the TOF sensor, and may determine how the housing structure 110 or the display 120 is extended, based on the corresponding distance.

In an embodiment, the electronic device 100 may further include a sensor (hereinafter, the extension detection sensor 160) configured to detect a contraction and/or extension state of the housing structure 110. In an embodiment, the extension detection sensor 160 may be configured to detect a specific state of the housing structure 110. For example, the extension detection sensor 160 may be configured to detect a state in which the housing structure 110 is extended to the maximum and a state in which the housing structure 110 is contracted to the minimum.

According to the illustrated embodiment, the extension detection sensor 160 may be implemented by at least one magnet 163 and/or hall sensors 161, 162. The electronic device 100 may include a first hall sensor 161 and a second hall sensor 162 disposed in the first housing structure 111. For example, the first housing structure 111 may include a structure in which the hall sensors 161, 162 are seated, and the hall sensors 161, 162 may be disposed on the corresponding structure. In another example, the first housing structure 111 may include a printed circuit board (not shown) disposed therein, and the hall sensors 161, 162 may be mounted on the corresponding printed circuit board.

In an embodiment, the first hall sensor 161 and the second hall sensor 162 may be spaced apart from each other along a moving direction of the second housing structure 112.

In an embodiment, the hall sensors 161, 162 may detect the magnet 163 included in the second housing structure 112. The magnet 163 may move integrally with the second housing structure 112. In an embodiment, in a first state in which the second housing structure 112 is spaced apart from the first housing structure 111 by the first distance, the magnet 163 may be positioned on a region corresponding to the first hall sensor 161. In a second state in which the second housing structure 112 is spaced apart from the first housing structure 111 by the second distance, the magnet 163 may be positioned on a region corresponding to the second hall sensor 162.

In an embodiment, the first state and the second state may correspond to the extension state and the contraction state of the housing structure 110, respectively. Referring to FIGS. 3A and 3B, in an embodiment, in a state in which the housing structure 111 is contracted (or extended), the magnet 163 may be positioned on a region corresponding to the first hall sensor 161 (or the second hall sensor 162). In an embodiment, in the contraction (or extension) state, the first hall sensor 161 (or the second hall sensor 162) may be disposed on a position corresponding to the magnet 163. When the magnet 163 is positioned on a region corresponding to any one of the hall sensors 161, 162, the hall sensors 161, 162 may detect the magnet 163. Accordingly, in the illustrated embodiment, the electronic device 100 may determine whether the housing structure 110 is in an extension state or a contraction state through the hall sensors 161, 162. In an embodiment, the electronic device 100 may determine that the display 120 is in a contraction (or extension) state, based on the first hall sensor 161 (or the second hall sensor 162) detecting the magnet 163.

In an embodiment, the hall sensor may detect not only whether there is a magnet on a corresponding region, but also an intensity of the magnet. For example, the hall sensor may distinguish between a first magnet having first magnetism and a second magnet having second magnetism.

In an embodiment, the magnet 162 may be implemented not only by a permanent magnet but also by an electromagnet. For example, the magnet 162 may be substituted with an electromagnet including a core including a magnetic substance and a coil wound around the core. A direction or an intensity of a magnetic field generated by the electromagnet may vary according to an intensity or a direction of a current flowing through the coil.

In the illustrated embodiment, the electronic device 100 may include two hall sensors 161, 162, but embodiments of the disclosure are not limited thereto. For example, the electronic device 100 may include a single hall sensor 161 or 162. In this case, the electronic device 100 may detect one of an extension state, a contraction state, or an intermediate extension state of the display 120 through the single hall sensor 161 or 162. In another example, the electronic device 100 may include three or more hall sensors.

In an embodiment, the electronic device 100 may include switches (not shown) (for example, a first switch, a second switch) and a pushing part which are configured to detect a contraction and/or extension state, as an alternative to the hall sensor and the magnet or in addition thereto. For example, the electronic device 100 may include a first switch (not shown) and a second switch (not shown) which are installed in the first housing structure 111 and are selectively pushed according to contraction and/or extension of the housing structure 110. The switches may be pressed by the pushing part (not shown) included in the second housing structure 112. The pushing part may press the first switch or the second switch according to a movement of the second housing structure 112 to the first housing structure 111. The electronic device 100 may determine a contraction and/or extension state of the housing structure 110 according to which switch is pressed. In an embodiment, the switches and the pushing part may correspond to the hall sensors 161, 162 and the magnet 163 of FIG. 3A, respectively. For example, the first switch and the second switch may replace the first hall sensor 161 and the second hall sensor 162, respectively, and the pushing part may replace the magnet 163.

In an embodiment, the electronic device 100 may include contact terminals (not shown) (for example, a first contact terminal, a second contact terminal, and a third contact terminal) configured to detect a contraction and/or extension state, as an alternative to the hall sensor and the magnet or in addition thereto. For example, the electronic device 100 may include the first contact terminal and the second contact terminal which are disposed in the first housing structure 111. The first contact terminal and the second contact terminal may selectively come into contact with the third contact terminal included in the second housing structure 112. The third contact terminal may be electrically connected with the first contact terminal or the second contact terminal according to a movement of the second housing structure 112 to the first housing structure 111. The electronic device 100 may determine a contraction and/or extension state of the housing structure 110 according to between which terminals an electrical connection occurs. In an embodiment, the contact terminals may correspond to the hall sensors 161, 162 and the magnet 163 of FIG. 3A. For example, the first contact terminal and the second contact terminal may replace the first hall sensor 161 and the second hall sensor 162, respectively, and the third contact terminal may replace the magnet 163.

Figure 4A:
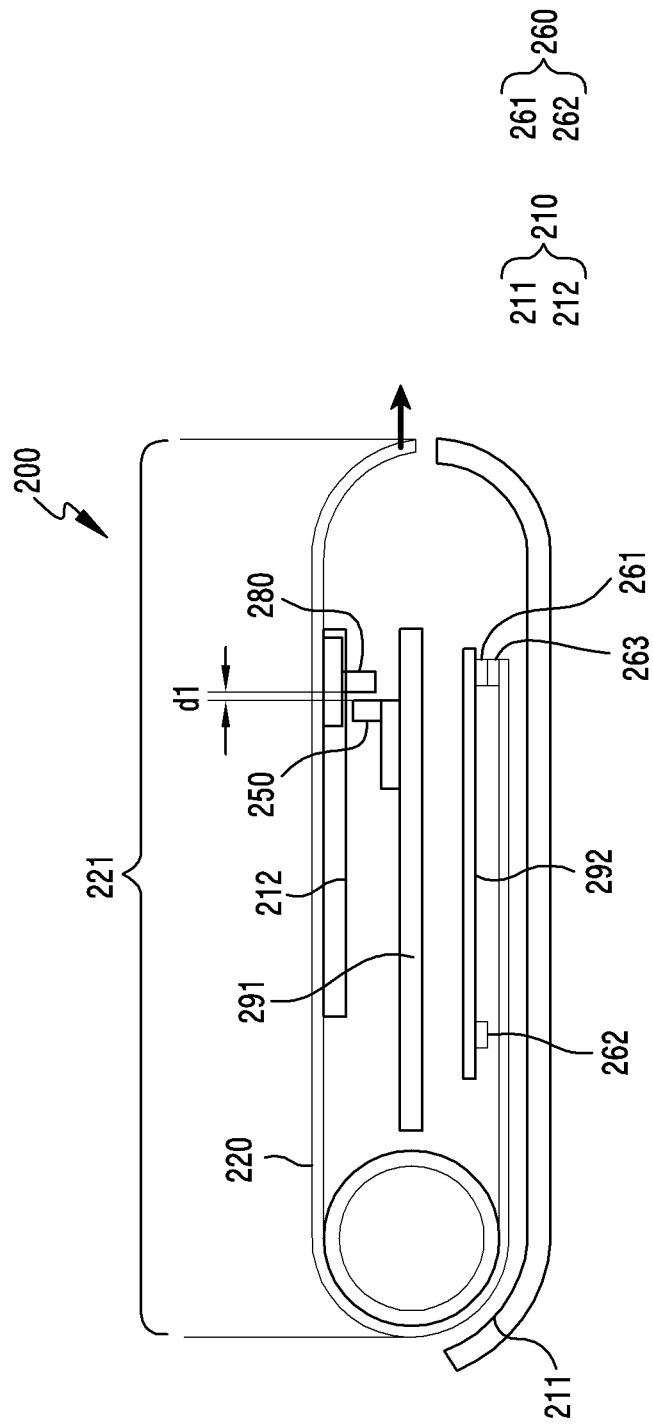
FIG. 4A is a cross-sectional view illustrating an electronic device in a contraction state according to various embodiments.
Figure 4B:
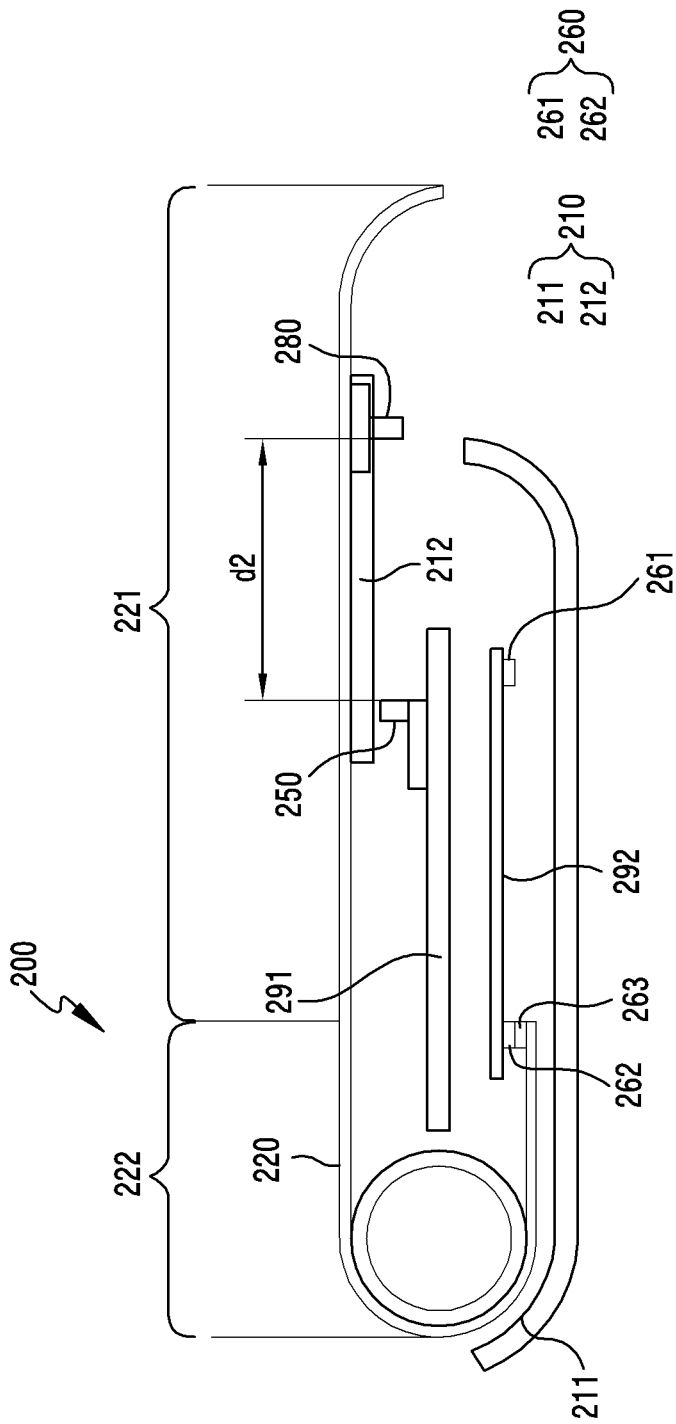
FIG. 4B is a cross-sectional view illustrating the electronic device in an extension state according to various embodiments.

FIG. 4A is a cross-sectional view illustrating an electronic device 200 in a contraction state according to various embodiments. FIG. 4B is a cross-sectional view illustrating the electronic device 200 in an extension state according to various embodiments. FIG. 4A is a cross-sectional view of the electronic device of FIG. 1A or 1B, taken along line I-I, according to various embodiments. FIG. 4B is a cross-sectional view of the electronic device of FIG. 1A or 1B, taken along line II-II, according to various embodiments.

The electronic device 200 of FIGS. 4A and 4B may include at least one of the components of FIG. 2.

Referring to FIGS. 4A and 4B, the electronic device 200 may include a housing structure 210 including a first housing structure 211 and a second housing structure 212 which is configured to be slidable with respect to the first housing structure 211. The housing structure 210 may be extended or extracted according to sliding of the second housing structure 212 to the first housing structure 211.

In an embodiment, the electronic device 200 may include a rollable display 220. The rollable display 220 may be connected to the second housing structure 212, and may be extended or contracted according to sling of the second housing structure 212 to the first housing structure 211. For example, when the housing structure 210 is contracted to a minimum, a first portion 221 of the display 220 may be exposed to the outside of the electronic device 200, and, when the housing structure 210 is extended to a maximum, the first portion 221 and a second portion 222 of the display 220 may be exposed to the outside of the electronic device 200.

In an embodiment, the electronic device 200 may include a distance sensor 250. In an embodiment, the distance sensor 250 may be disposed on a printed circuit board 291 disposed in the first housing structure 211. The distance sensor 250 may transmit (or emit) a signal to an object 280 connected to the second housing structure 212. The signal arriving at the object 280 may be reflected toward the distance sensor 250 and may be detected again by the distance sensor 250. The distance sensor 250 may measure a distance between the distance sensor 250 and the object 280 using transmission and reception of a signal.

In the illustrated embodiment, the distance measured by the distance sensor 250 (for example, a TOF sensor) may have a range between a first distance d1 and a second distance d2. The first distance d1 may be defined as a distance between the first housing structure 211 and the second housing structure 212 when the housing structure 210 is contracted to the minimum, and the second distance d2 may be defined as a distance between the first housing structure 211 and the second housing structure 212 when the housing structure 210 is extended to the maximum.

In an embodiment, the electronic device 200 may include an extension detection sensor 260. In an embodiment, the extension detection sensor 260 may be implemented by a plurality of hall sensors 261, 262. For example, the hall sensors 261, 262 disposed in the first housing structure 211 may detect a position of the second housing 212 on the first housing structure 211 by detecting a magnet 263, which moves along with the second housing structure 212.

In an embodiment, the electronic device 200 may include a hall sensor 260 which detects that the second housing structure 212 slides on the first housing structure 211 by a designated distance. The designated distance may be a maximum extension distance, a minimum contraction distance, or an intermediate extension distance. For example, the electronic device 200 may include a first hall sensor 261 to detect a contraction state of the housing structure 210, and a second hall sensor 262 to detect an extension state of the housing structure 210.

In an embodiment, the hall sensor 260 may be disposed in the first housing structure 211. In an embodiment, the hall sensor 260 may be disposed on a structure 292 in the first housing structure 211. For example, the structure 292 on which the hall sensor 260 is disposed may include a printed circuit board. In an embodiment, the magnet 263 to be detected by the hall sensor 260 may be disposed on one surface of the display 220. In the illustrated embodiment, in the contraction state of the housing structure 210, the magnet 263 may be positioned on a region corresponding to the first hall sensor 261. When the housing structure 210 is extended, the display 220 may be extended and the magnet 263 may move to a region corresponding to the second hall sensor 262. Accordingly, the electronic device 200 may identify that the housing structure 210 is contracted through the first hall sensor 261, and may identify that the housing structure 210 is extended through the second hall sensor 262. The position of the hall sensor 260 in the illustrated embodiment is merely an example, and embodiments of the disclosure are not limited thereto. For example, the hall sensor 260 may be disposed to detect whether the housing structure 210 is in an intermediate state between the extension state and the contraction state.

In an embodiment, the electronic device 200 may include switches (not shown) (for example, a first switch, a second switch) and a pushing part which are configured to detect a contraction and/or extension state, as an alternative to the hall sensors 261, 262 and the magnet 263 or in addition thereto. In an embodiment, the electronic device 200 may include a first switch (not shown) and a second switch (not shown) which are installed in the first housing structure 211 and are selectively pressed according to contraction and/or extension of the housing structure 210. The switches may be pressed by the pushing part (not shown) which moves along with the display. The pushing part may press the first switch or the second switch according to a movement of the second housing structure 212 to the first housing structure 211. The electronic device 200 may determine a contraction and/or extension state of the housing structure 210 according to which switch is pressed. In an embodiment, the switches and the pushing part may correspond to the hall sensors 261, 262 and the magnet 263 of FIG. 4A, respectively. For example, the first switch and the second switch may replace the first hall sensor 261 and the second hall sensor 262, respectively, and the pushing part may replace the magnet 263.

In an embodiment, the electronic device 200 may include contact terminals (not shown) (for example, a first contact terminal, a second contact terminal, and a third contact terminal) configured to detect a contraction and/or extension state, as an alternative to the hall sensor and the magnet or in addition thereto. For example, the electronic device 200 may include the first contact terminal and the second contact terminal which are disposed in the first housing structure 211. The first contact terminal and the second contact terminal may selectively come into contact with the third contact terminal connected to the display. The third contact terminal may be electrically connected with the first contact terminal or the second contact terminal according to a movement of the second housing structure 212 to the first housing structure 211. The electronic device 200 may determine a contraction and/or extension state of the housing structure 210 according to between which terminals an electrical connection occurs. In an embodiment, the contact terminals may correspond to the hall sensors 261, 262 and the magnet 263 of FIG. 4A. For example, the first contact terminal and the second contact terminal may replace the first hall sensor 261 and the second hall sensor 262, respectively, and the third contact terminal may replace the magnet 263.

Figure 5:
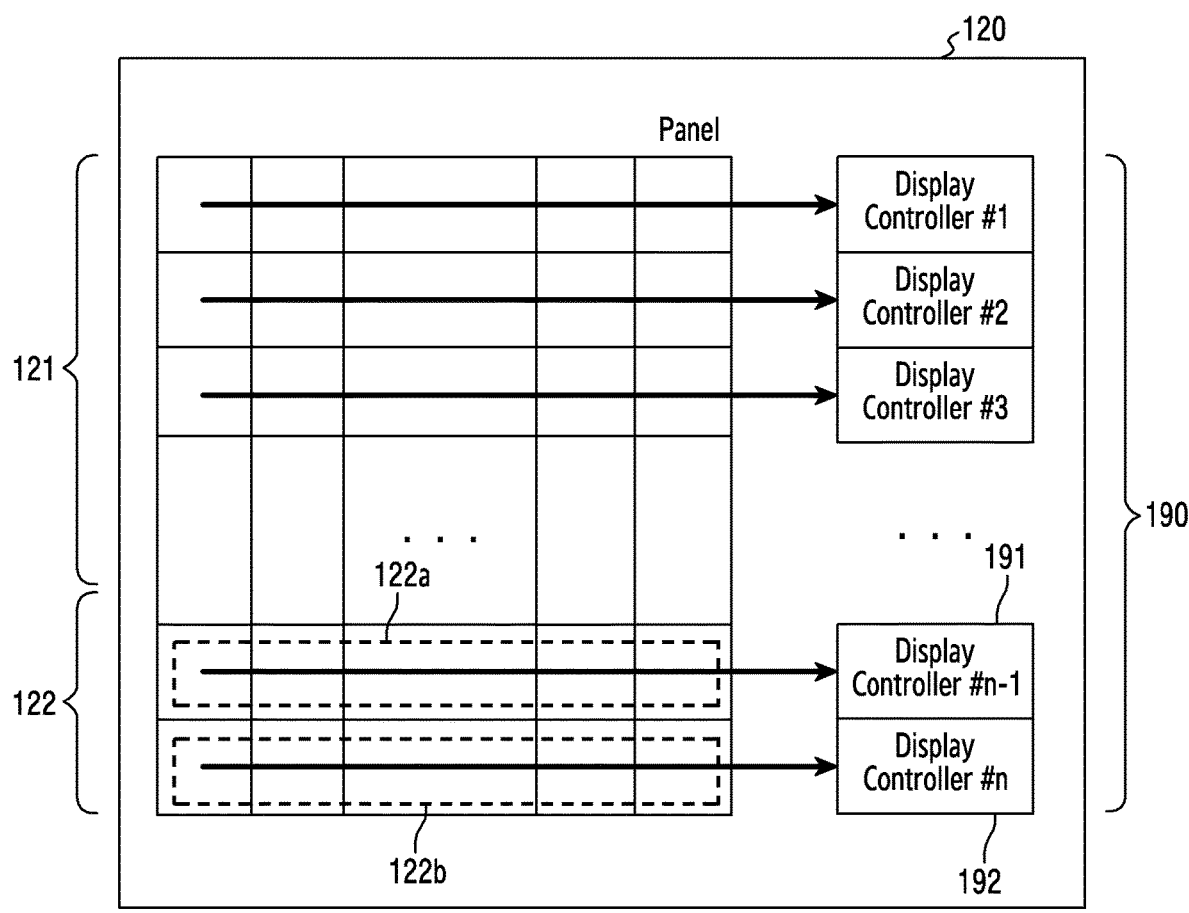
FIG. 5 is a diagram illustrating gates for controlling a rollable display according to various embodiments.

FIG. 5 is a diagram illustrating gates 190 for controlling the rollable display 120 according to various embodiments.

In an embodiment, the electronic device 100 may include a plurality of gates 190 to independently control respective regions of the rollable display 120. The gates 190 may independently control operations of light emitters (for example, pixels) allocated to the gates, respectively. For example, the respective gates may control operations or luminance of the light emitters.

In an embodiment, the electronic device 100 may display a screen on a portion of the display 120 that is exposed to the outside in the entire region using the distance sensor 150. The electronic device 100 may control the gates 190 not to operate a portion that is rolled in and is not exposed to the outside of the electronic device 100 in the entire region of the display 120. For example, the screen may not be displayed on the portion of the display 120 that is not exposed to the outside in the entire region. Since the plurality of gates 190 partially take charge of the display 120 in an embodiment, the electronic device 100 may control the screen displayed on the display 120 to have a size corresponding to a size of the portion of the display 120 that is exposed to the outside in the entire region.

For example, the electronic device 100 may include a first gate 191 and a second gate 192. The first gate 191 may take charge of a first portion 122a of a rolling portion 122 of the display 120. The second gate 192 may take charge of a second portion 122b adjacent to the first portion 122a of the rolling portion 122. Since none of the first portion 122a and the second portion 122b is exposed to the outside when the display 120 is in a contraction state, the electronic device 100 may control the first gate 191 and the second gate 192 not to display the screen on the first portion 122a and the second portion 122b. When only the first portion 122a is exposed to the outside as the display 120 is extended, the electronic device 100 may control the first gate 191 to display a part of the screen on the first portion 122a, and may control the second gate 192 not to display the screen on the second portion 122b. When the display 120 is in an extension state, the electronic device 100 may control the first gate 191 and the second gate 192 to display a part of the screen on both of the first portion 122a and the second portion 122b.

Figure 6:
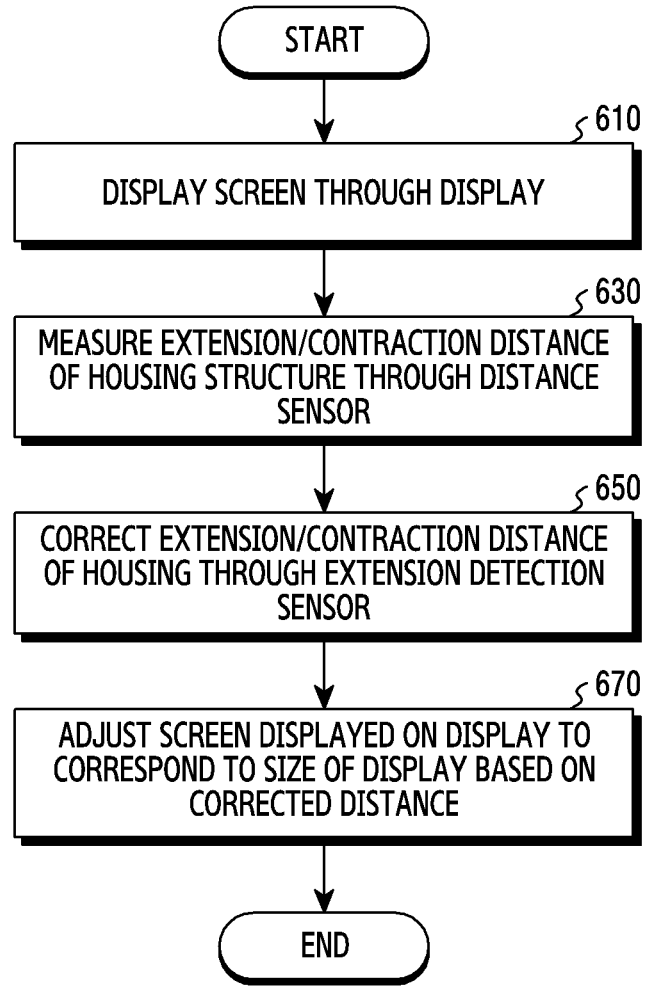
FIG. 6 is a flowchart illustrating an example method for adjusting a screen displayed on a display according to a degree of extension of a housing structure in an electronic device including a rollable display according to various embodiments.

In an embodiment, a minimum width of the display 120 that one gate takes charge of may correspond to a minimum distance recognizable by the distance sensor 150. For example, when the TOF sensor measures a distance between the housing structures 110 in the unit of about 1 mm, a minimum width of the display 120 that a single gate takes charge of may be about 1 mm. FIG. 6 is a flowchart illustrating an example method for adjusting a screen displayed on a display 120 according to a degree of extension of a housing structure 110 in an electronic device 100 including a rollable display 120 according to various embodiments. Operations (operations 610 to 670) of FIG. 6 may be implemented by the electronic device (or the processor of the electronic device) described in FIGS. 1A, 1B, 2, 3A, 3B, 4A, 4B, and/or 5. The operations of FIG. 6 will be described with reference to the electronic device 100 of FIG. 1A for convenience of explanation, but the operations may be performed by another electronic device (for example, the electronic device 300 of FIG. 1B).

In an embodiment, in operation 610, the electronic device 100 may display a screen through the display 120. In an embodiment, the electronic device 100 may display a screen on a portion that is exposed to the outside of the electronic device 100 in the entire region of the display 120. Referring to FIG. 1A, the electronic device 100 in a contraction state may display the screen on the first portion 121. The electronic device 100 in an extension state may display the screen on both the first portion 121 and the second portion 122.

In an embodiment, in operation 630, the electronic device 100 may measure a degree of extension of the housing structure 110 using the distance sensor 150. For example, referring to FIG. 3A, the electronic device 100 may measure a distance between the first housing structure 111 and the second housing structure 112 through a TOF sensor disposed in the second housing structure 112. A distance between the TOF sensor and the object 180 that is measured by the TOF sensor may increase or decrease according to a movement of the second housing structure 112 to the first housing structure 111.

In an embodiment, the electronic device 100 may determine how the housing structure 110 is extended through the distance sensor 150. The electronic device 100 may determine a size of a portion that is exposed to the outside of the electronic device 100 in the entire region of the display 120, according to the degree of extension of the housing structure 110. In an embodiment, when the distance between the first housing structure 111 and the second housing structure 112 has a predetermined value, the electronic device 100 may recognize that the display 120 has a size corresponding to the predetermined value. Referring back to FIGS. 3A and 3B, when the distance between the first housing structure 111 and the second housing structure 112 is a first distance (for example, d1 of FIG. 3A), the electronic device 100 may recognize that the display 120 is in a contraction state. In another example, when the distance between the first housing structure 111 and the second housing structure 112 is a second distance (for example, d2 of FIG. 3B), the electronic device 100 may recognize that the display 120 is in an extension state. In another example, when the distance between the first housing structure 111 and the second housing structure 112 is between the first distance and the second distance, the electronic device 100 may recognize that the display 120 is in an intermediate state.

In an embodiment, the electronic device 100 may display the screen of the size corresponding to the portion that is exposed in the entire region of the display 120. For example, when an image is displayed on the display 120 and the display 120 is contracted and/or extended, the image may be naturally reduced and/or enlarged according to contraction and/or extension of the display 120. Since the electronic device 100 measures an extension length of the display 120 relatively accurately through the TOF sensor, the size of the image may be continuously (or gradually) reduced and/or enlarged while the display 120 is contracted and/or extended.

The distance between the first housing structure 111 and the second housing structure 112 that is acquired through the distance sensor 150 may have a difference from a real distance due to performance degradation or malfunction of the distance sensor 150. Referring to FIG. 3A, for example, a distance measured by the TOF sensor may not be equal to the first distance. Accordingly, when the degree of extension of the display 120 is determined only using the distance sensor 150, the screen displayed on the display 120 may not match the size of the display 120 really exposed to the outside. For example, the image may be extended beyond the degree of extension of the display 120 or may be extended below the degree of extension of the display 120.

In an embodiment, in operation 650, the electronic device 100 may correct the measured distance through the extension detection sensor 160. A real distance between the first housing structure 111 and the second housing structure 112 in a minimum contraction and/or maximum extension state may be determined by a mechanical design, and thus may have a designated value. A value measured by the distance sensor 150 in the minimum contraction and/or maximum extension state of the housing structure 110 may have a difference from a real distance. Since the electronic device 100 may detect the minimum contraction and/or maximum extension state of the housing structure 110 through the extension detection sensor 160, the electronic device 100 may correct distance information obtained through the distance sensor 150 using the extension detection sensor 160.

In an embodiment, the electronic device may correct a measurement value of the distance sensor using an offset between the value measured by the distance sensor and a real distance. For example, in a contraction state of the housing structure, a real distance between the first housing structure and the second housing structure may be the first distance $d1$, and the distance measured through the distance sensor 150 may be a first measurement value $dm1$. There may be offset of $\Delta d1$ ($=d1-dm1$) between the measurement value and the real distance. In this case, the electronic device may calculate an accurate distance by adding the offset $\Delta d1$ to a certain value $dm$ measured through the distance sensor. In another example, in an extension state of the housing structure, a real distance between the first housing structure and the second housing structure may be the second distance $d2$, and the distance measured through the distance sensor 150 may be a second measurement value $dm2$. There may be offset of $\Delta d2$ ($=d2-dm2$) between the measurement value and the real distance. In this case, the electronic device may calculate an accurate distance by adding the offset $\Delta d2$ to a certain value $dm$ measured through the distance sensor. The method of correcting a measurement value of the distance sensor is not limited thereto, and in an embodiment, the electronic device may correct the measurement value by multiplying a value measured through the distance sensor by a predetermined correction constant value.

In an embodiment, the electronic device 100 may frequently correct a certain distance measured through the distance sensor 150. For example, the electronic device 100 may refine an offset value or a correction constant value between a value measured by the distance sensor 150 and a real value every time extension or contraction of the housing is detected through the extension detection sensor 160.

In an embodiment, when the distance sensor 150 outputs a value $dm$ between the first value $dm1$ and the second value $dm2$, the distance $d$ between the first housing structure 111 and the second housing structure 112 may be determined by a segment connecting first coordinates ($dm1$, $d1$) and second coordinates ($dm2$, $d2$). That is, the distance $d$ between the first housing structure 111 and the second housing structure 112 may be determined by an equation of $d=(d1-d2)/(dm1-dm2)*(dm-dm1)+d1$ or $d=(d1-d2)/(dm1-dm2)*(dm-dm2)+d2$. The electronic device 100 may determine a size of a portion of the display 120 that is exposed to the outside, based on the distance $d$ between the first housing structure 111 and the second housing structure 112.

In an embodiment, the first distance $d1$ and the second distance $d2$ are values defined at a product designing step, and may be pre-stored in the memory 170 of the electronic device 100. The first distance $d1$ and the second distance $d2$ may vary according to a model of a product. For example, the first distance $d1$, the second distance $d2$ of a first product may be 10, 30, respectively, and the first distance $d1$, the second distance 2 of a second product may be 11, 29. According to an embodiment, even if the distance measured by the distance sensor 150 is accurate, a value measured by the distance sensor 150 may not correspond to a size of a portion of the display 120 that is really exposed. For example, a foreign substance may be stuck in the electronic device 100 or a minute deformation may be generated in a distance between components in the electronic device 100 while the electronic device 100 is in use. For example, the first distance that is measured by the distance sensor 150 in a minimum contraction state of the display 120 at the time when the electronic device 100 is manufactured may be different from the first distance that is measured by the distance sensor 150 in a minimum contraction state of the display 120 after one year. The same may be applied to the second distance. Accordingly, when the electronic device 100 determines a state of the display 120 using a value measured by the distance sensor 150, the electronic device 100 may determine that the display 120 is not fully contracted or extended, although the display 120 is fully contracted or extended in reality.

For example, if a value measured by the distance sensor 150 according to contraction and/or extension of the display 120 at a first time has a range from 10 to 30, the screen displayed on the display 120 may have a first size when a value measured by the distance sensor 150 is 20. If time elapses and a value measured by the distance sensor 150 according to contraction and/or extension of the display 120 at a second time has a range from 11 to 31, the size of the screen to be displayed on the display 120 should be different from the first size even when a value measured by the distance sensor 150 is 20. For example, if a value measured by the distance sensor 10 at the second time has a range from 9 to 31, the electronic device 100 should determine that the display 120 is not fully contracted or extended even when a value measured by the distance sensor 150 is 10 or 30.

To address this problem, the electronic device 100 in an embodiment may update the real distance d1, d2 between the first housing structure and the second housing structure using the distance sensor 150. For example, when the extension detection sensor 160 detects that the housing is contracted, the electronic device 100 may update the first distance d1 to a value dm1 measured by the distance sensor 150. In another example, when the extension detection sensor 160 detects that the housing is extended, the electronic device 100 may update the second distance d2 to a value dm2 measured by the distance sensor 150.

In an embodiment, in operation 670, the electronic device 100 may control (e.g., adjust) a screen to be displayed on the display 120 using the distance sensor 150 and/or the expansion detection sensor 160. The electronic device 100 may display a screen of a size corresponding to a degree of extension of the display 120 using a distance measured through the distance sensor 150 or a distance corrected through the extension detection sensor 160.

In an embodiment, when the distance is determined by the distance sensor 150, the electronic device 100 may determine a size of the portion of the display 120 that is exposed to the outside. For example, an electronic device (for example, the electronic device 100 of FIG. 1A) including a rollable display 120 which has a constant height and has a width extended or contracted may determine a width of a portion of the display 120 exposed to the outside, based on a distance by which the housing structure 110 is extended. In another example, an electronic device (for example, the electronic device 300 of FIG. 1B) including a rollable display which has a constant width and has a height extended or contracted may determine a height of ae portion of the display 120 exposed to the outside, based on a distance by which the housing structure 310 is extended.

In an embodiment, the electronic device 100 may display the screen on the display 120 based on the determined size of the display 120. For example, the electronic device 100 may adjust the size of the screen displayed on the display 120 to be suited to the size of the display 120 while the display 120 is being extended or contracted. In another example, the electronic device 100 may adjust the size of the screen displayed on the display 120 to be suited to the size of the display 120 after the extension or contraction event of the display 120 is finished.

Figure 7:
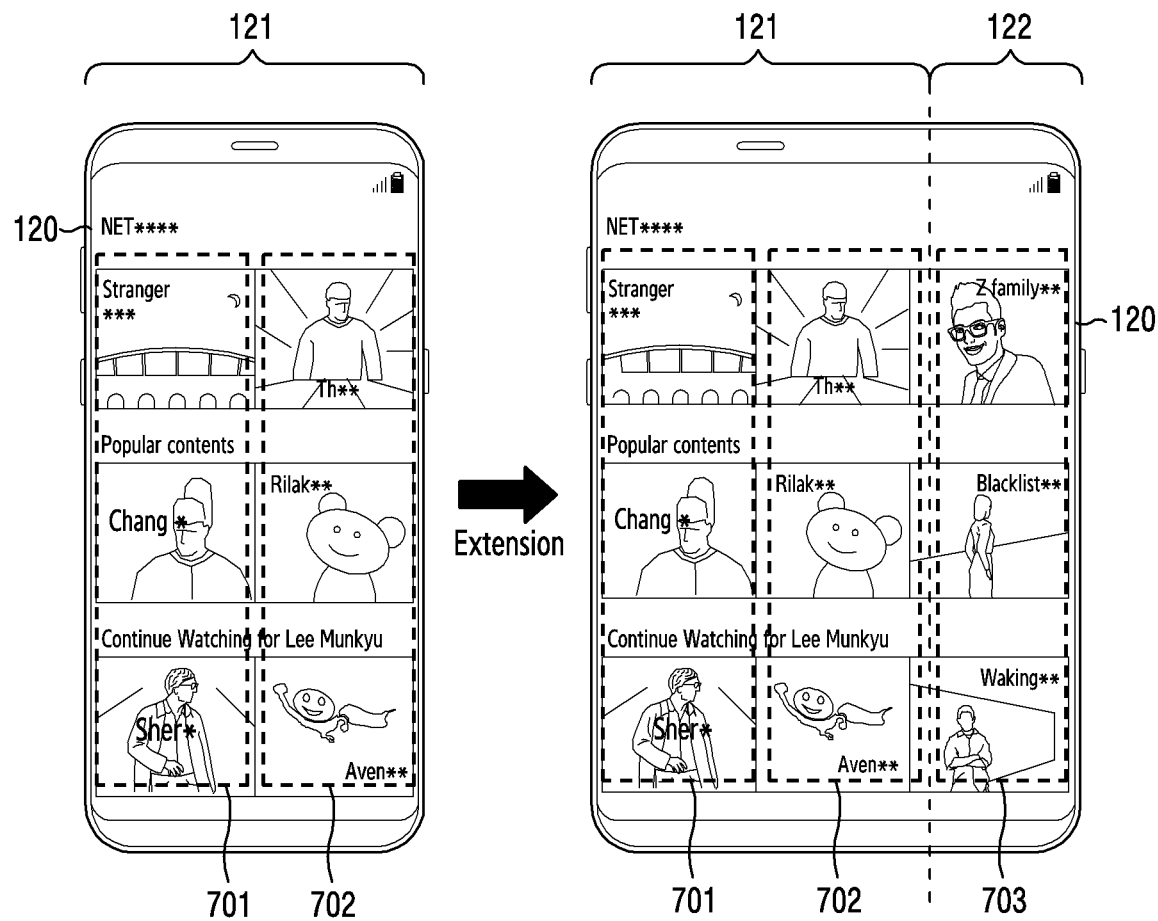
FIG. 7 is a diagram illustrating an example operation of adding contents to be displayed on a display according to extension of the display according to various embodiments.
Figure 8:
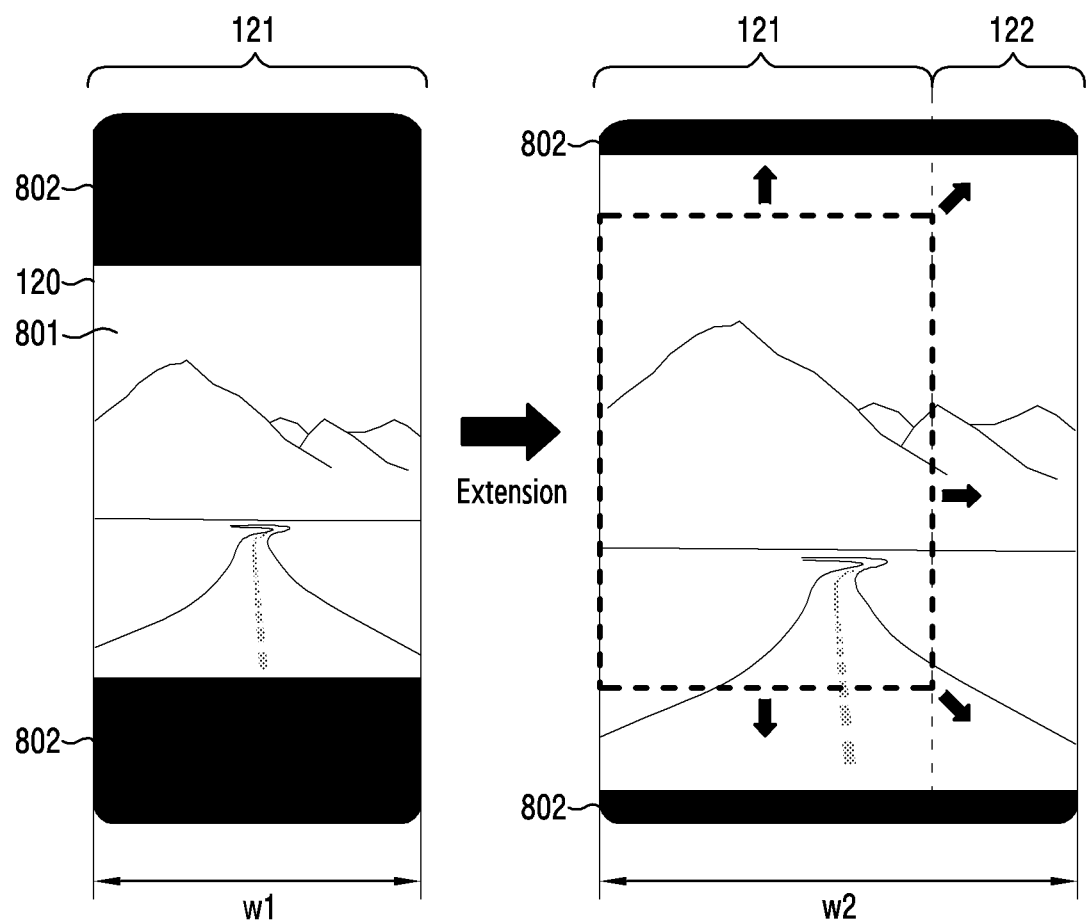
FIG. 8 is a diagram illustrating an example operation of extending a screen displayed on a display according to extension of the display according to various embodiments.

FIG. 7 is a diagram illustrating an example operation of adding contents to be displayed on the display according to extension of the display according to various embodiments. FIG. 8 is a diagram illustrating an example operation of enlarging a screen displayed on the display according to extension of the display according to various embodiments.

Referring to FIG. 7, in an embodiment, additional contents may be displayed on the display 120 according to extension of the display 120. In the illustrated embodiment, contents included in a user interface of an application which provides images may change according to extension of the display 120. The image providing application may provide thumbnails corresponding to various contents through a user interface. Thumbnails that are not displayed in the contraction state may be displayed according to extension of the display 120.

In the embodiment illustrated in FIG. 7, when the display 120 is in a contraction state, the first portion 121 may be exposed on the front surface of the electronic device 100, and a first content 701 and a second content 702 may be displayed through the first portion 121. When the display 120 is in an extension state, the second portion 122 may also be exposed on the front surface of the electronic device 100, and a third content 703 that is not displayed in the contraction state may be displayed through the second portion 122.

For example, when a user manually extends the housing structure 110, the display 120 may be extended by components (for example, a spring, a motor, a gear) included in the electronic device 100. The electronic device 100 may recognize that the housing structure 110 is being extended through a hall sensor. When it is determined that the housing structure 110 is being extended, the electronic device 100 may measure a distance between the first housing structure 111 and the second housing structure 112 in real time using a TOF sensor. In an embodiment, the distance between the first housing structure 111 and the second housing structure 112 may be transmitted to an application displayed through the display 120 through a framework. The application may express a user interface (for example, a UI gadget or a UI component) provided by the framework. In an embodiment, the application may provide a screen corresponding to a size of the display directly extended.

In an embodiment, the electronic device 100 may temporarily stop (for example, pause) a content (for example, an image) currently display on the display 120 while the display 120 is being extended. After the extension of the display 120 is completed, the electronic device 100 may refine the size of the application screen and may display the extended content on the display 120. In an embodiment, the electronic device 100 may refine the size of the application screen in real time and may provide a content or a graphic effect suited to the refined size of the screen.

For example, referring to FIG. 7, when contents 701, 702 are displayed on the first portion 121 of the display 120, and the size of the display 120 is extended, the framework may transmit information indicating that the size of the display 120 is extended up to the second portion 122 to the application. The application may provide an extended user interface (UI) component (or extended contents 701, 702, 703) based on the extended size of the display 120. In another example, when the size of the display 120 is reduced, the user interface (or content 703) displayed on the extended second portion 122 may disappear again.

In an embodiment, the whole user interface may have a deployment or size changed based on the size of the display 120. For example, when the user interface includes a plurality of contents, the plurality of contents may be deployed by 2×2 in a reduction state of the size of the display 120, and may be deployed by 3×3 when the size of the display 120 is enlarged.

Referring to FIG. 8, in an embodiment, a size of an image 801 displayed on the display 120 may be enlarged and/or reduced according to contraction and/or extension of the display 120. In the illustrated embodiment, as the display 120 is extended, the image 801 may be enlarged. As a difference between an aspect ratio of the image 801 and an aspect ratio of the display 120 increases, a size of a letter box 802 which is a portion except for the image 801 in the entire region of the screen may increase. When the difference in the aspect ratio between the display 120 and the image 801 decreases as the display 120 is extended, the image 801 may be enlarged and the size of the letter box 802 except for the image 801 may be reduced.

In an embodiment, the second portion 122 of the electronic device 101 may be exposed to the outside while the display 120 is being changed from a contraction state to an extension state. In an embodiment, the electronic device 100 may enlarge the image 801 to correspond to a size of a sum of the first portion 121 and the second portion 122, and may display the image 801 on the first portion 121 and the second portion 122. In the embodiment illustrated in FIG. 8, when the display 120 is in the contraction state, the first portion 121 may be exposed on the front surface of the electronic device 100, and the image 801 may be displayed to have a width w1 corresponding to a horizontal length of the first portion 121. When the display 120 is in the extension state, the second portion 122 may also be exposed on the front surface of the electronic device 100, and the image 801 may be displayed to have a width w2 corresponding a sum length of the horizontal length of the first portion 121 and a horizontal length of the second portion 122.

In an embodiment, the electronic device 100 may detect an extension length of the display 120 in real time using the distance sensor 150. Accordingly, while the display 120 is being contracted and/or extended, the size of the image 801 may be continuously (or gradually) reduced and/or enlarged. When the image 801 is continuously enlarged/reduced, the user may immediately recognize an effect resulting from the contraction and/or extension of the display 120, and accordingly, usability of the rollable display 120 may be enhanced.

A foreign substance may be stuck in the driver 140 configured to contract and/or extend the display 120, or inner components may wear down. A motor control value necessary for contracting and/or extending the display 120 by a predetermined length may vary according to a condition of the driver 140. For example, when the driver 140 is under a normal condition, the motor may extend the display 120 by a first length in response to a first control value. When the driver 140 is under an abnormal condition, an extended length of the display 120 may be below the first length even if the same first control value is inputted to the motor. When the driver 140 is under the abnormal condition, a control value greater than the first control value may be needed for the motor to extend the display 120 by the first length.

In an embodiment, the electronic device 100 may determine how the display 120 is extended through the distance sensor 150. In an embodiment, the electronic device 100 may contract and/or extend the housing structure 110 by a target length by actively adjusting the motor control value using the distance sensor 150. For example, when performance of the motor capable of extending the housing structure 110 (or the display 120) by a target length in response to the first control value is degraded, the housing structure 110 may be extended by a distance below the target length in response to the first control value. The electronic device 100 may extend the housing structure 110 by the target distance by inputting a second control value which is greater than the first control value to the motor.

In an embodiment, the electronic device 100 may detect an abnormal operation of the driver 140 using the distance sensor 150. In an embodiment, the electronic device 100 may provide a breakdown signal when a motor control value is beyond an allowable level. For example, when a range of a control value allowable by the motor is determined to be between a first value and a second value, and a control value greater than the second value is required to extend the display 120, the electronic device may provide a breakdown signal to a user. In an embodiment, the electronic device 100 may provide a notification to provide a product repair through a device manager. For example, the breakdown signal may be provided in the form of a notification through the display 120. The electronic device 100 may protect the driver 140 including the motor by providing the breakdown signal.

Figure 9:
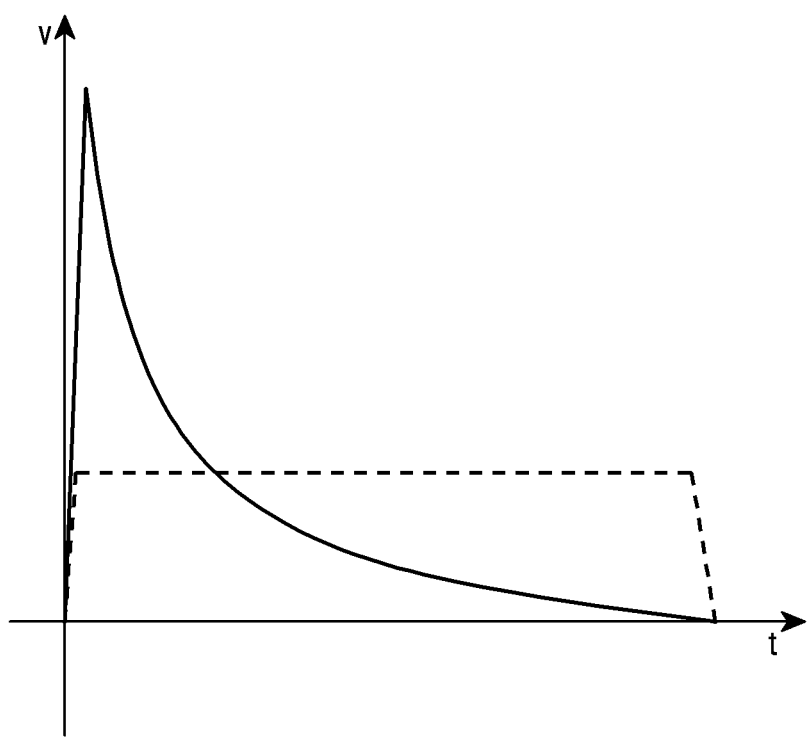
FIG. 9 is a graph illustrating a driving speed of a motor for contracting and/or extending a display according to various embodiments.

FIG. 9 is a driving velocity graph of the motor for contracting and/or extending the display 120 according to various embodiments.

In an embodiment, the electronic device 100 may control a motor speed. Referring to FIG. 9, a dashed line may indicate a case where the motor is driven at uniform velocity, and a solid line may indicate a case where a strong force is given at the initial stage and the velocity is gradually reduced. In both cases, the motor may be driven at the same time and the screen may be extended by the same distance by the motor. However, there may be a big difference in usability.

When the display 120 is extended rapidly at the initial stage, a user may feel that the display 120 is relatively rapidly extended, compared to the case where the display 120 is extended at uniform velocity. In addition, there may be no friction resistance in a section in which a high load is exerted at the initial step, and inertia caused by an instantaneous torque may be corrected through the TOF sensor, so that the motor may be stably driven by a desired distance. Finally, an internal impact caused by instantaneous stop may be mitigated.

In an embodiment, when a user input for applying a force by a user and extending the display 120 by a predetermined distance or extending the display 120 through a touch sensor provided in the electronic device 100 is received, the electronic device 100 may supply a current to the motor and may drive the motor.

In an embodiment, the electronic device 100 may accurately detect an extension state of the display 120 through the distance sensor 150, so that a distance error factor caused by control through the motor and artificial control by the user may be removed. In an embodiment, when the display 120 is extended to some extent by a user applying a force, the electronic device 100 may determine how the display 120 is extended using the distance sensor 150. The electronic device 100 may calculate a distance necessary for extending the display 120 to a maximum, and may adjust a current (or a control value) supplied to the motor. By doing this, the electronic device 100 may provide a scree suited to the extended size of the display 120.

Figure 10:
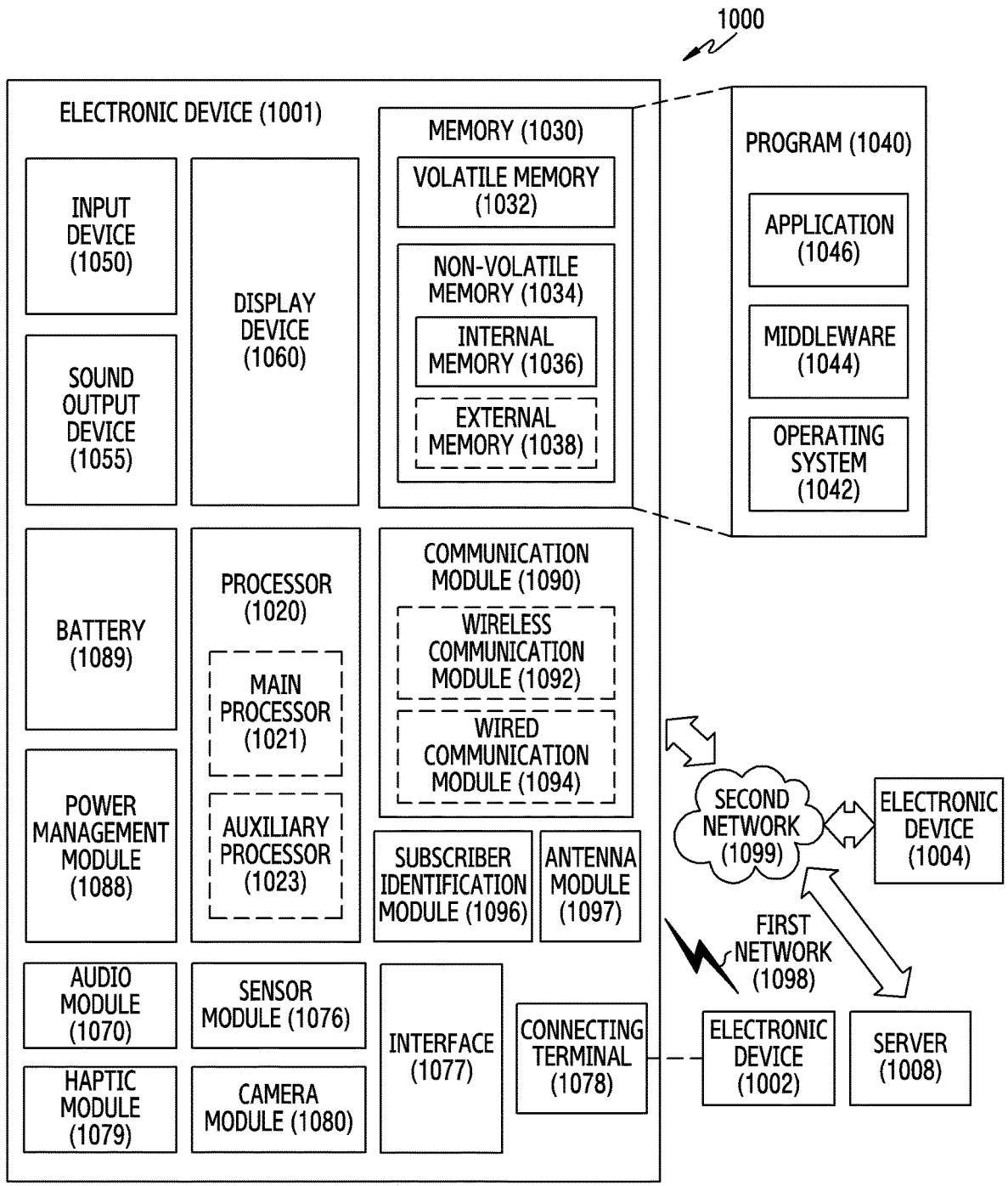
FIG. 10 is a block diagram illustrating an example electronic device in a network environment according to various embodiments.

FIG. 10 is a block diagram illustrating an example electronic device 1001 in a network environment 1000 according to various embodiments.

Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In various embodiments, at least one (e.g., the display device 1060 or the camera module 1080) of the components may be omitted from the electronic device 1001, or one or more other components may be added in the electronic device 1001. In various embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element including a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

According to an example embodiment, an electronic device may include: a housing including a first housing and a second housing coupled to the first housing to be movable with respect to the first housing structure within a specified range; a rollable display visible to an outside of the electronic device through a part of the housing, the rollable display including a first portion configured to be selectively visible to the outside according to the movement of the second housing with respect to the first housing structure, the first portion being visible to the outside based on the second housing structure moving in a first direction away from the first housing, and the first portion not being visible to the outside based on the second housing structure moving in a second direction opposite to the first direction; a first sensor disposed in the second housing and configured to measure a distance of the second housing to the first housing; a second sensor disposed in the housing and configured to detect a first state in which the second housing is spaced apart from the first housing by a first distance; a memory disposed in the housing structure and including data regarding the first distance; and at least one processor disposed in the housing structure and operatively coupled with the rollable display, the first sensor, the second sensor, and the memory, and, while a screen is displayed through the display, the at least one processor is configured to: measure the distance of the second housing to the first housing through the first sensor; based on the first state being detected through the second sensor, correct the distance measured by the first sensor, based at least on a difference between the distance measured by the first sensor and the first distance; and adjust the screen to correspond to a size of a portion visible to the outside of the electronic device in an entire region of the rollable display, based on the corrected distance.

In an example embodiment, the first sensor may include at least one of a time of flight (TOF) sensor, an ultrasonic distance sensor, or a distance sensor of a radio wave method.

In an example embodiment, the electronic device may further include a magnet disposed in the first housing, and the second sensor may include a hall sensor disposed in the second housing in the first housing, and the magnet in the first state may be configured to be positioned on a certain region corresponding to the hall sensor.

In an example embodiment, the electronic device may further include a pushing part disposed in the first housing, the second sensor may include a switch disposed in the second housing in the first housing structure, and the pushing part in the first state may be configured to press the switch.

In an example embodiment, the electronic device may further include a first terminal disposed in the first housing, the second sensor may include a second terminal disposed in the second housing in the first housing structure, and the first terminal in the first state may be configured to contact the second terminal.

In an example embodiment, the electronic device may further include a plurality of gates configured to independently control respective regions of the rollable display, the plurality of gates being electrically connected with the at least one processor, and the at least one processor may further be configured to control the display to display the screen on the portion that is visible to the outside in the entire region of the rollable display, by controlling the plurality of gates based on the corrected distance.

In an example embodiment, the plurality of gates may include a first gate configured to control a second portion of the first portion, and a second gate configured to control a third portion of the first portion adjacent to the second portion, and, based on the second portion being visible to the outside and the third portion not being visible to the outside, the at least one processor may further be configured to control the first gate and the second gate to display a part of the screen on the second portion and to not display the screen on the third portion.

In an example embodiment, in a state in which a part of the first portion is visible to the outside, the at least one processor may be configured to control the display to display a screen of a size corresponding to the portion that is viewed from the outside in the entire region of the rollable display using the first sensor.

In an example embodiment, the at least one processor may further be configured to control the display to display a screen continuously changing in response to a size of the portion visible to the outside in the entire region of the display while the display is contracted and/or extended.

In an example embodiment, while an application is executed, the at least one processor may further be configured to control the display to display a first content provided by the application on a fourth portion visible to the outside in the entire region of the display in the first state, and to display a second content provided by the application on a fifth portion newly visible to the outside while the display is extended.

In an example embodiment, the at least one processor may further be configured to: control the display to display a first image on a fourth portion visible to the outside in the entire region of the display in the first state; and display, on a fifth portion newly visible to the outside while the display is extended and the fourth portion, wherein the first image is enlarged to correspond to a sum size of the fourth portion and the fifth portion.

In an example embodiment, the electronic device may further include a motor configured to drive to contract and/or extend the housing, and the at least one processor may further be configured to operate the motor at a high speed at a first stage while the display is extended, and to reduce, at a specified rate, the speed of the motor as a time is elapsed.

In an example embodiment, the electronic device may further include a motor configured to drive to contract and/or extend the housing, and the at least one processor may further be configured to adjust a control value of the motor using the first sensor.

In an example embodiment, based on the control value of the motor exceeding a numerical value allowable by the motor, the at least one processor may further be configured to provide a notification indicating that an operation of the motor is not normal.

In an example embodiment, a method of controlling an electronic device including an extendable housing and a rollable display contracted or extended according to contraction or extension of the housing may include: displaying a screen through the display; measuring an extension distance of the housing through a first sensor provided in the electronic device; based on a first state of the housing structure being detected through a second sensor provided in the electronic device, correcting the distance measured by the first sensor, based at least on a difference between the distance measured through the first sensor and a specified distance, the specified distance corresponding to an extension distance of the housing structure based on the housing structure being in the first state; and adjusting the screen to correspond to a size of a portion visible to an outside in an entire region of the display, based on the corrected length.

In an example embodiment, displaying the screen on the portion of the display visible to the outside may include displaying a screen of a size corresponding to a portion visible from the outside in the entire region of the display using the distance sensor in an intermediate extension state in which a portion of the display is exposed to the outside.

In an example embodiment, displaying the screen on the portion visible to the outside in the entire region of the display may include displaying a screen continuously changing in response to a size of the portion visible to the outside in the entire region of the display while the display is being contracted and/or extended.

In an example embodiment, displaying the screen on the portion visible from the outside in the entire region of the display may include: displaying a first content related to an application displayed on the display on a first portion visible to the outside in the entire region of the display in a contraction state of the housing; and displaying a second content related to the application on a second portion newly visible to the outside while the display is being extended.

In an example embodiment, displaying the screen on the portion visible from the outside in the entire region of the display may include: displaying a first image on the first portion visible to the outside in the entire region of the display in the contraction state of the housing, and displaying the enlarged first image on the second portion newly visible to the outside while the display is being extended, and on the first portion.

In an example embodiment, the method may further include extending the display at a first specified rate at a first stage while the display is being extended, and extending at a second specified rate as a time is elapsed.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to", "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium.

Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium. According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. An electronic device comprising:
   a housing comprising a first housing and a second housing coupled to the first housing to be movable with respect to the first housing within a specified range;
   a rollable display visible to an outside of the electronic device through a part of the housing, the rollable display comprising a first portion selectively visible to the outside according to the movement of the second housing with respect to the first housing, the first portion being visible to the outside based on the second housing structure moving in a first direction away from the first housing, and the first portion not being visible to the outside based on the second housing moving in a second direction opposite to the first direction;
   a first sensor disposed in the second housing and configured to measure a distance of the second housing to the first housing;

a second sensor disposed in the housing and configured to detect a first state in which the second housing is spaced apart from the first housing by a first distance;

a memory disposed in the housing and configured to store data regarding the first distance; and at least one processor disposed in the housing and operatively coupled with the rollable display, the first sensor, the second sensor, and the memory, wherein, while a screen is displayed through the display, the at least one processor is configured to:

measure the distance of the second housing to the first housing structure through the first sensor;

based on the first state being detected through the second sensor, correct the distance measured by the first sensor, based at least on a difference between the distance measured by the first sensor and the first distance; and adjust the screen to correspond to a size of a portion visible to the outside of the electronic device in an entire region of the rollable display, based on the corrected distance.

2. The electronic device of claim 1, wherein the first sensor comprises at least one of a time of flight (TOF) sensor, an ultrasonic distance sensor, or a distance sensor of a radio wave method.

3. The electronic device of claim 1, further comprising a magnet disposed in the first housing, wherein the second sensor comprises a hall sensor disposed in the second housing in the first housing structure, wherein the magnet in the first state is configured to be positioned on a certain region corresponding to the hall sensor.

4. The electronic device of claim 1, further comprising a pushing part disposed in the first housing, wherein the second sensor comprises a switch disposed in the second housing in the first housing, wherein the pushing part in the first state is configured to press the switch.

5. The electronic device of claim 1, further comprising a first terminal disposed in the first housing, wherein the second sensor comprises a second terminal disposed in the second housing in the first housing structure, wherein the first terminal in the first state is configured to contact the second terminal.

6. The electronic device of claim 1, further comprising a plurality of gates configured to independently control respective regions of the rollable display, the plurality of gates being electrically connected with the at least one processor, wherein the at least one processor is further configured to control the display to display the screen on the portion visible to the outside in the entire region of the rollable display, by controlling the plurality of gates based on the corrected distance.

7. The electronic device of claim 6, wherein the plurality of gates comprise a first gate configured to control a second portion of the first portion, and a second gate configured to control a third portion of the first portion adjacent to the second portion, and wherein, based on the second portion being visible to the outside and the third portion not being visible to the outside, the at least one processor is further configured to control the first gate and the second gate to display a part of the screen on the second portion and to not display the screen on the third portion.

8. The electronic device of claim 1, wherein, in a state in which a part of the first portion is visible to the outside, the at least one processor is configured to control the display to display a screen of a size corresponding to the portion visible from the outside in the entire region of the rollable display using the first sensor.

9. The electronic device of claim 1, wherein the at least one processor is further configured to control the display to display a screen continuously changing in response to a size of the portion visible to the outside in the entire region of the display while the display is contracted and/or extended.

10. The electronic device of claim 1, wherein, while an application is executed, the at least one processor is further configured to control the display to display a first content provided by the application on a fourth portion visible to the outside in the entire region of the display in the first state, and to display a second content provided by the application on a fifth portion newly visible to the outside while the display is extended.

11. The electronic device of claim 1, wherein the at least one processor is further configured to control the display to:

display a first image on a fourth portion visible to the outside in the entire region of the display in the first state; and display, on a fifth portion newly visible to the outside while the display is extended and the fourth portion, the first image being enlarged to correspond to a sum size of the fourth portion and the fifth portion.

12. The electronic device of claim 1, further comprising a motor configured to drive to contract and/or extend the housing, wherein the at least one processor is further configured to operate the motor at a specified speed at a first stage while the display is extended, and to reduce the speed of the motor at a specified rate as a time is elapsed.

13. The electronic device of claim 1, further comprising a motor configured to drive to contract and/or extend the housing structure, wherein the at least one processor is further configured to adjust a control value of the motor using the first sensor.

14. The electronic device of claim 13, wherein, based on the control value of the motor exceeding a numerical value allowable by the motor, the at least one processor is further configured to provide a notification indicating that an operation of the motor is not normal.

15. A method of controlling an electronic device comprising an extendable housing and a rollable display configured to be contracted or extended according to contraction or extension of the housing, the method comprising:

displaying a screen through the display;

measuring an extension distance of the housing through a first sensor provided in the electronic device;

based on a first state of the housing structure being detected through a second sensor provided in the electronic device, correcting the distance measured by the first sensor, based at least on a difference between the distance measured through the first sensor and a specified distance, the specified distance corresponding to an extension distance of the housing based on the housing being in the first state; and adjusting the screen to correspond to a size of a portion visible to an outside in an entire region of the display, based on the corrected length.

16. The method of claim 15, wherein the displaying of the screen comprises displaying a screen of a size corresponding to a portion visible from the outside in the entire region of the display using the first sensor in a state in which a portion of the display is visible to the outside.

17. The method of claim 15, wherein the displaying of the screen comprises displaying a screen continuously changing in response to a size of the portion visible to the outside in the entire region of the display while the display is contracted and/or extended.

18. The method of claim 15, wherein the displaying of the screen comprises:
- displaying a first content related to an application displayed on the display on a first portion visible to the outside in the entire region of the display in a contraction state of the housing; and
- displaying a second content related to the application on a second portion newly visible to the outside while the display is being extended.

19. The method of claim 15, wherein the displaying of the screen comprises:
- displaying a first image on a first portion visible to the outside in the entire region of the display in a contraction state of the housing; and
- displaying the enlarged first image on a second portion newly visible to the outside while the display is being extended and on the first portion.

20. The method of claim 15, further comprising:
- operating a motor configured to drive to contract and/or extend the housing at a specified speed at a first stage while the display is extended; and
- reducing the speed of the motor at a specified rate as a time is elapsed.

* * * * *